(12) United States Patent
Alderucci et al.

(10) Patent No.: US 9,411,944 B2
(45) Date of Patent: Aug. 9, 2016

(54) BIOMETRIC ACCESS SENSITIVITY

(75) Inventors: Dean P. Alderucci, Westport, CT (US);
Joseph M. Asher, Las Vegas, NV (US);
Antonio Papageorgiou, Bronx, NY (US)

(73) Assignee: CFPH, LLC, New York, NY (US)

( * ) Notice: Subject to any disclaimer, the term of this patent is extended or adjusted under 35 U.S.C. 154(b) by 604 days.

(21) Appl. No.: 11/559,933

(22) Filed: Nov. 15, 2006

(65) Prior Publication Data

US 2008/0113787 A1 May 15, 2008

(51) Int. Cl.
*H04K 1/00* (2006.01)
*G06F 21/31* (2013.01)
*G07F 17/32* (2006.01)

(52) U.S. Cl.
CPC .............. *G06F 21/31* (2013.01); *G07F 17/323* (2013.01); *G07F 17/3237* (2013.01); *G07F 17/3241* (2013.01); *A63F 2300/532* (2013.01); *G06F 2221/2111* (2013.01); *G07F 17/3206* (2013.01)

(58) Field of Classification Search
CPC ............ G06F 21/31; G06F 2221/2111; G07F 17/3206; G07F 17/323; G07F 17/3237; G07F 17/3241
USPC .............................. 713/186, 168, 182; 463/29
See application file for complete search history.

(56) References Cited

U.S. PATENT DOCUMENTS

| | | |
|---|---|---|
| 3,580,581 A | 5/1971 | Raven |
| 3,838,259 A | 9/1974 | Kortenhaus |
| 3,876,208 A | 4/1975 | Wachtler et al. |
| 3,929,338 A | 12/1975 | Busch |
| 4,101,129 A | 7/1978 | Cox |
| 4,120,294 A | 10/1978 | Wolfe |
| 4,157,829 A | 6/1979 | Goldman et al. |
| 4,206,920 A | 6/1980 | Weatherford et al. |
| 4,216,965 A | 8/1980 | Morrison et al. |

(Continued)

FOREIGN PATENT DOCUMENTS

| | | |
|---|---|---|
| CN | 1346549 | 4/2002 |
| DE | 31 29 550 A1 | 4/1982 |

(Continued)

OTHER PUBLICATIONS

International Search Report for International Application No. PCT/US07/84669; 2 pages; Jun. 6, 2008.

(Continued)

*Primary Examiner* — Samson Lemma
(74) *Attorney, Agent, or Firm* — Thomas D. Bradshaw

(57) ABSTRACT

The present application provides methods and corresponding systems for accessing services on a gaming device which, in certain embodiments, include the step or steps of receiving at least one item of identity verification data from a user of a gaming device; enabling at least one service, such as a wager-type game, on the gaming device based on a match between the at least one item of identity verification data received and at least one item of identity verification data obtained previously; displaying an interface screen comprising graphic objects associated with the wager-type game and at least one selectable element for the user to submit a gaming command and a wagering command during game play; obtaining at least one item of user change data from a user during game play; and prompting the user for identity verification data when a user change is suspected based on the at least one item of user change data.

23 Claims, 3 Drawing Sheets

(56) References Cited

U.S. PATENT DOCUMENTS

| | | | |
|---|---|---|---|
| 4,238,127 A | 12/1980 | Lucero et al. |
| 4,240,635 A | 12/1980 | Brown |
| 4,266,214 A | 5/1981 | Peters, Jr. |
| 4,335,809 A | 6/1982 | Wain |
| 4,448,419 A | 5/1984 | Telnaes |
| 4,467,424 A | 8/1984 | Hedges et al. |
| 4,492,379 A | 1/1985 | Okada |
| 4,527,798 A | 7/1985 | Siekierski et al. |
| 4,556,158 A | 12/1985 | Blanchard et al. |
| 4,572,509 A | 2/1986 | Sitrick |
| 4,573,681 A | 3/1986 | Okada |
| 4,614,342 A | 9/1986 | Takashima |
| 4,624,459 A | 11/1986 | Kaufman |
| 4,636,951 A | 1/1987 | Harlick |
| 4,648,600 A | 3/1987 | Oliiges |
| 4,652,998 A | 3/1987 | Koza et al. |
| 4,692,863 A | 9/1987 | Moosz |
| 4,760,527 A | 7/1988 | Sidley |
| 4,805,907 A | 2/1989 | Hagiwara |
| 4,810,868 A | 3/1989 | Drexler |
| 4,817,951 A | 4/1989 | Crouch et al. |
| 4,838,552 A | 6/1989 | Hagiwara |
| 4,853,884 A | 8/1989 | Brown et al. |
| 4,856,787 A | 8/1989 | Itkis |
| 4,858,932 A | 8/1989 | Keane |
| 4,880,237 A | 11/1989 | Kishishita |
| 4,909,516 A | 3/1990 | Kolinsky |
| 4,926,327 A | 5/1990 | Sidley |
| 4,959,783 A | 9/1990 | Scott et al. |
| 4,964,638 A | 10/1990 | Ishida |
| 5,007,087 A | 4/1991 | Bernstein et al. |
| 5,024,441 A | 6/1991 | Rosseau |
| 5,048,833 A | 9/1991 | Lamle |
| 5,050,881 A | 9/1991 | Nagao |
| 5,055,662 A | 10/1991 | Hasegawa |
| 5,056,141 A | 10/1991 | Dyke |
| 5,074,559 A | 12/1991 | Okada |
| 5,083,785 A | 1/1992 | Okada |
| 5,096,195 A | 3/1992 | Gimmon |
| 5,096,202 A | 3/1992 | Hesland |
| 5,102,134 A | 4/1992 | Smyth |
| 5,151,684 A | 9/1992 | Johnsen |
| 5,192,076 A | 3/1993 | Komori |
| 5,229,764 A | 7/1993 | Matchett et al. |
| 5,242,163 A | 9/1993 | Fulton |
| 5,251,165 A | 10/1993 | James, III |
| 5,251,898 A | 10/1993 | Dickenson et al. |
| 5,263,716 A | 11/1993 | Smyth |
| 5,265,874 A | 11/1993 | Dickinson et al. |
| 5,280,426 A | 1/1994 | Edmonds |
| 5,280,909 A | 1/1994 | Tracy |
| 5,298,476 A | 3/1994 | Hotta et al. |
| 5,324,035 A | 6/1994 | Morris et al. |
| 5,326,104 A | 7/1994 | Pease et al. |
| 5,344,199 A | 9/1994 | Carstens et al. |
| 5,351,970 A | 10/1994 | Fioretti |
| 5,359,183 A | 10/1994 | Skodlar |
| 5,370,306 A | 12/1994 | Schulze et al. |
| 5,380,007 A | 1/1995 | Travis et al. |
| 5,380,008 A | 1/1995 | Mathis et al. |
| 5,393,061 A | 2/1995 | Manship et al. |
| 5,398,932 A | 3/1995 | Eberhardt et al. |
| 5,415,416 A | 5/1995 | Scagnelli et al. |
| 5,421,576 A | 6/1995 | Yamazaki et al. |
| 5,429,361 A | 7/1995 | Raven et al. |
| 5,471,044 A | 11/1995 | Hotta et al. |
| 5,476,259 A | 12/1995 | Weingardt |
| 5,505,449 A | 4/1996 | Eberhardt et al. |
| 5,507,485 A | 4/1996 | Fisher |
| 5,511,784 A | 4/1996 | Furry et al. |
| 5,524,888 A | 6/1996 | Heidel |
| 5,534,685 A | 7/1996 | Takemoto et al. |
| 5,551,692 A | 9/1996 | Pettit et al. |
| 5,569,083 A | 10/1996 | Fioretti |
| 5,569,084 A | 10/1996 | Nicastro et al. |
| 5,580,309 A | 12/1996 | Piechowiak et al. |
| 5,586,937 A | 12/1996 | Menashe |
| 5,588,913 A | 12/1996 | Hecht |
| 5,613,912 A | 3/1997 | Slater |
| 5,618,232 A | 4/1997 | Martin |
| 5,653,634 A | 8/1997 | Hodges |
| 5,654,746 A | 8/1997 | McMullan, Jr. et al. |
| 5,655,961 A | 8/1997 | Acres et al. |
| 5,675,828 A | 10/1997 | Stoel et al. |
| 5,697,844 A | 12/1997 | Von Kohorn |
| 5,702,302 A | 12/1997 | Gauselmann |
| 5,707,286 A | 1/1998 | Carlson |
| 5,738,583 A | 4/1998 | Comas et al. |
| 5,745,102 A | 4/1998 | Bloch et al. |
| 5,762,552 A | 6/1998 | Vuong et al. |
| 5,764,789 A | 6/1998 | Pare, Jr. et al. |
| 5,766,076 A | 6/1998 | Pease et al. |
| 5,768,382 A | 6/1998 | Schneier et al. |
| 5,772,508 A * | 6/1998 | Sugita et al. ............. 463/36 |
| 5,785,595 A | 7/1998 | Gauselmann |
| 5,816,920 A | 10/1998 | Hanai |
| 5,833,536 A | 11/1998 | Davids et al. |
| 5,835,722 A | 11/1998 | Bradshaw et al. |
| 5,836,817 A | 11/1998 | Acres et al. |
| 5,851,148 A | 12/1998 | Brune et al. |
| 5,857,911 A | 1/1999 | Fioretti |
| 5,871,398 A | 2/1999 | Schneier et al. |
| 5,878,211 A | 3/1999 | Delagrange |
| 5,889,474 A | 3/1999 | LaDue |
| 5,902,983 A | 5/1999 | Crevelt et al. |
| 5,904,619 A | 5/1999 | Scagnelli et al. |
| 5,904,620 A | 5/1999 | Kujawa |
| 5,907,282 A | 5/1999 | Tuorto et al. |
| 5,910,047 A | 6/1999 | Scagnelli et al. |
| 5,920,640 A | 7/1999 | Salatino et al. |
| 5,921,865 A | 7/1999 | Scagnelli |
| 5,931,764 A | 8/1999 | Freeman et al. |
| 5,935,005 A | 8/1999 | Tsuda et al. |
| 5,951,397 A | 9/1999 | Dickinson |
| 5,954,583 A | 9/1999 | Green |
| 5,955,961 A | 9/1999 | Wallerstein |
| 5,959,596 A | 9/1999 | McCarten et al. |
| 5,970,143 A | 10/1999 | Schneier et al. |
| 5,977,957 A * | 11/1999 | Miller et al. ............. 345/174 |
| 5,987,611 A | 11/1999 | Freund |
| 5,991,431 A | 11/1999 | Borza et al. |
| 5,995,630 A | 11/1999 | Borza et al. |
| 5,999,808 A | 12/1999 | LaDue |
| 6,001,016 A | 12/1999 | Walker et al. |
| 6,003,013 A | 12/1999 | Boushy et al. |
| 6,011,973 A | 1/2000 | Valentine et al. |
| 6,012,636 A | 1/2000 | Smith |
| 6,012,982 A | 1/2000 | Piechowiak et al. |
| 6,019,284 A | 2/2000 | Freeman et al. |
| 6,022,274 A * | 2/2000 | Takeda et al. ............. 463/44 |
| 6,027,115 A | 2/2000 | Griswold et al. |
| 6,048,269 A | 4/2000 | Burns et al. |
| 6,050,622 A | 4/2000 | Gustafson |
| 6,065,056 A | 5/2000 | Bradshaw et al. |
| 6,080,061 A | 6/2000 | Watanabe et al. |
| 6,098,985 A | 8/2000 | Moody |
| 6,099,408 A | 8/2000 | Schneier et al. |
| 6,100,804 A | 8/2000 | Brady et al. |
| 6,104,295 A | 8/2000 | Gaisser et al. |
| 6,104,815 A | 8/2000 | Alcorn |
| 6,117,011 A | 9/2000 | Lvov |
| 6,135,884 A | 10/2000 | Hedrick et al. |
| 6,139,431 A | 10/2000 | Walker et al. |
| 6,146,270 A | 11/2000 | Huard et al. |
| 6,148,094 A | 11/2000 | Kinsella |
| 6,177,905 B1 | 1/2001 | Welch |
| 6,178,255 B1 | 1/2001 | Scott et al. |
| 6,178,510 B1 | 1/2001 | O'Connoe et al. |
| 6,183,366 B1 | 2/2001 | Goldberg et al. |
| 6,193,153 B1 | 2/2001 | Lambert |
| 6,196,920 B1 | 3/2001 | Spaur et al. |
| 6,210,274 B1 | 4/2001 | Carlson |
| 6,212,392 B1 | 4/2001 | Fitch et al. |
| 6,219,439 B1 | 4/2001 | Burger |

(56) References Cited

U.S. PATENT DOCUMENTS

| | | |
|---|---|---|
| 6,233,448 B1 | 5/2001 | Alperovich et al. |
| 6,248,017 B1 | 6/2001 | Roach |
| 6,251,014 B1 | 6/2001 | Stockdale et al. |
| 6,251,017 B1 | 6/2001 | Leason et al. |
| 6,264,560 B1 | 7/2001 | Goldberg et al. |
| 6,265,973 B1 | 7/2001 | Brammall et al. |
| 6,272,223 B1 | 8/2001 | Carlson |
| 6,277,026 B1 | 8/2001 | Archer |
| 6,277,029 B1 | 8/2001 | Hanley |
| 6,280,325 B1 | 8/2001 | Fisk |
| 6,287,202 B1 | 9/2001 | Pascal et al. |
| 6,290,601 B1 | 9/2001 | Yamazaki et al. |
| RE37,414 E | 10/2001 | Harlick |
| 6,309,307 B1 | 10/2001 | Krause et al. |
| 6,320,495 B1 | 11/2001 | Sporgis |
| 6,325,285 B1 | 12/2001 | Baratelli |
| 6,325,292 B1 | 12/2001 | Sehr |
| 6,331,148 B1 | 12/2001 | Krause et al. |
| 6,386,976 B1 | 5/2002 | Yamazaki et al. |
| 6,388,612 B1 | 5/2002 | Neher |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson |
| 6,441,752 B1 | 8/2002 | Fomukong |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia et al. |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,705 B1 | 4/2003 | Cumbers |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,604,980 B1 | 8/2003 | Jurmain |
| 6,612,928 B1 | 9/2003 | Bradford et al. |
| 6,614,350 B1 | 9/2003 | Lunsford |
| 6,618,706 B1 | 9/2003 | Rive et al. |
| 6,622,157 B1 | 9/2003 | Heddaya et al. |
| 6,628,939 B2 | 9/2003 | Paulsen |
| 6,631,849 B2 | 10/2003 | Blossom |
| 6,634,942 B2 | 10/2003 | Walker |
| 6,652,378 B2 | 11/2003 | Cannon et al. |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,719,631 B1 | 4/2004 | Tulley et al. |
| 6,721,542 B1 | 4/2004 | Anttila et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 | 7/2004 | Narita |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,806,889 B1 | 10/2004 | Malaure |
| 6,812,824 B1 | 11/2004 | Goldinger et al. |
| 6,834,195 B2 | 12/2004 | Brandenberg et al. |
| 6,837,789 B2 | 1/2005 | Garahi et al. |
| 6,839,560 B1 | 1/2005 | Bahl et al. |
| 6,843,412 B1 | 1/2005 | Sanford |
| 6,843,725 B2 | 1/2005 | Nelson |
| 6,846,238 B2 | 1/2005 | Wells et al. |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,893,347 B1 | 5/2005 | Zilliacus |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,942,574 B1 | 9/2005 | Lemay et al. |
| 6,945,870 B2 | 9/2005 | Gatto et al. |
| RE38,812 E | 10/2005 | Acres et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Ngyuyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,029,394 B2 | 4/2006 | Leen et al. |
| 7,033,276 B2 | 4/2006 | Walker et al. |
| 7,034,683 B2 | 4/2006 | Ghazarian |
| 7,035,653 B2 | 4/2006 | Simon et al. |
| 7,040,987 B2 | 5/2006 | Walker et al. |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 * | 5/2006 | Bennett ........................ 704/275 |
| 7,056,217 B1 | 6/2006 | Pelkey et al. |
| 7,081,815 B2 | 7/2006 | Runyon et al. |
| 7,097,562 B2 | 8/2006 | Gagner |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,128,482 B2 | 10/2006 | Meyerhofer et al. |
| 7,144,011 B2 | 12/2006 | Asher et al. |
| 7,147,558 B2 | 12/2006 | Giobbi |
| 7,158,798 B2 | 1/2007 | Lee et al. |
| 7,168,626 B2 | 1/2007 | Lerch et al. |
| 7,185,360 B1 | 2/2007 | Anton et al. |
| 7,194,273 B2 | 3/2007 | Vaudreuil |
| 7,207,885 B2 | 4/2007 | Longman |
| 7,228,651 B1 | 6/2007 | Saari |
| 7,229,354 B2 | 6/2007 | McNutt et al. |
| 7,229,385 B2 | 6/2007 | Freeman et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,284,708 B2 | 10/2007 | Martin |
| 7,288,025 B1 | 10/2007 | Cumbers |
| 7,288,028 B2 | 10/2007 | Rodriquez et al. |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,316,619 B2 | 1/2008 | Nelson |
| 7,341,517 B2 | 3/2008 | Asher et al. |
| 7,357,717 B1 | 4/2008 | Cumbers |
| 7,394,405 B2 | 7/2008 | Godden |
| 7,413,513 B2 | 8/2008 | Nguyen et al. |
| 7,429,215 B2 | 9/2008 | Rozkin |

(56) References Cited

U.S. PATENT DOCUMENTS

| | | |
|---|---|---|
| 7,435,179 B1 | 10/2008 | Ford |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,458,894 B2 | 12/2008 | Danieli |
| 7,460,863 B2 | 12/2008 | Steelberg et al. |
| 7,470,191 B2 | 12/2008 | Xidos |
| 7,479,065 B1 | 1/2009 | McAllister et al. |
| 7,506,172 B2 | 3/2009 | Bhakta |
| 7,510,474 B2 | 3/2009 | Carter |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 7,637,810 B2 | 12/2009 | Amaitis et al. |
| 7,665,668 B2 | 2/2010 | Phillips |
| 7,686,687 B2 | 3/2010 | Cannon et al. |
| 7,689,459 B2 | 3/2010 | Capurso et al. |
| 7,736,221 B2 | 6/2010 | Black et al. |
| 7,742,972 B2 | 6/2010 | Lange et al. |
| 7,744,002 B2 | 6/2010 | Jones et al. |
| 7,819,749 B1 | 10/2010 | Fish et al. |
| 7,828,652 B2 | 11/2010 | Nguyen et al. |
| 7,828,661 B1 | 11/2010 | Fish et al. |
| 7,867,083 B2 | 1/2011 | Wells et al. |
| 7,946,917 B2 | 5/2011 | Kaminkow et al. |
| 7,967,682 B2 | 6/2011 | Huizinga |
| 8,016,667 B2 | 9/2011 | Benbrahim et al. |
| 8,047,914 B2 | 11/2011 | Morrow |
| 8,123,616 B2 | 2/2012 | Wells et al. |
| 8,142,283 B2 | 3/2012 | Lutnick |
| 8,162,756 B2 | 4/2012 | Amaitis et al. |
| 8,267,789 B2 | 9/2012 | Nelson |
| 8,285,484 B1 | 10/2012 | Lau |
| 8,298,078 B2 * | 10/2012 | Sutton et al. .................. 463/29 |
| 8,306,830 B1 | 11/2012 | Renuart |
| 8,425,314 B2 | 4/2013 | Benbrahim |
| 8,968,077 B2 | 3/2015 | Weber et al. |
| 9,280,648 B2 | 3/2016 | Alderucci |
| 9,306,952 B2 | 4/2016 | Burman et al. |
| 9,355,518 B2 | 5/2016 | Amaitis |
| 2001/0018663 A1 | 8/2001 | Dussell et al. |
| 2001/0026240 A1 | 10/2001 | Neher |
| 2001/0026610 A1 | 10/2001 | Katz et al. |
| 2001/0026632 A1 | 10/2001 | Tamai |
| 2001/0027130 A1 | 10/2001 | Namba et al. |
| 2001/0028308 A1 | 10/2001 | De La Huerga |
| 2001/0031663 A1 * | 10/2001 | Johnson .................. 463/42 |
| 2001/0034237 A1 | 10/2001 | Garahi |
| 2001/0034268 A1 | 10/2001 | Thomas et al. |
| 2001/0036858 A1 | 11/2001 | McNutt et al. |
| 2001/0049275 A1 | 12/2001 | Pierry et al. |
| 2001/0055991 A1 | 12/2001 | Hightower |
| 2002/0002075 A1 | 1/2002 | Rowe |
| 2002/0013827 A1 | 1/2002 | Edstrom et al. |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0087505 A1 | 7/2002 | Smith |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0123377 A1 | 9/2002 | Shulman |
| 2002/0124182 A1 | 9/2002 | Bacso |
| 2002/0125886 A1 | 9/2002 | Bates et al. |
| 2002/0128057 A1 | 9/2002 | Walker et al. |
| 2002/0132663 A1 * | 9/2002 | Cumbers .................. 463/25 |
| 2002/0138461 A1 | 9/2002 | Sinclair |
| 2002/0142839 A1 | 10/2002 | Wolinsky |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter, Sr. |
| 2002/0151344 A1 | 10/2002 | Tanskanen |
| 2002/0155884 A1 | 10/2002 | Updike |
| 2002/0157090 A1 | 10/2002 | Anton, Jr. |
| 2002/0160834 A1 | 10/2002 | Urie et al. |
| 2002/0160838 A1 | 10/2002 | Kim |
| 2002/0165020 A1 | 11/2002 | Koyama |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair |
| 2002/0198044 A1 | 12/2002 | Walker |
| 2002/0198051 A1 | 12/2002 | Lobel et al. |
| 2003/0003988 A1 | 1/2003 | Walker et al. |
| 2003/0003997 A1 | 1/2003 | Vuong et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0013513 A1 | 1/2003 | Rowe |
| 2003/0014639 A1 | 1/2003 | Jackson et al. |
| 2003/0017871 A1 | 1/2003 | Urie et al. |
| 2003/0028567 A1 | 2/2003 | Carlson |
| 2003/0031321 A1 | 2/2003 | Mages |
| 2003/0032407 A1 | 2/2003 | Mages |
| 2003/0032434 A1 | 2/2003 | Willner et al. |
| 2003/0032474 A1 | 2/2003 | Kaminkow et al. |
| 2003/0036425 A1 | 2/2003 | Kaminkow et al. |
| 2003/0036428 A1 | 2/2003 | Aasland |
| 2003/0040324 A1 | 2/2003 | Eldering et al. |
| 2003/0045353 A1 | 3/2003 | Paulsen et al. |
| 2003/0045354 A1 | 3/2003 | Globbi |
| 2003/0045358 A1 | 3/2003 | Leen et al. |
| 2003/0050115 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 * | 4/2003 | Grauzer et al. ............. 463/29 |
| 2003/0064805 A1 | 4/2003 | Wells |
| 2003/0064807 A1 | 4/2003 | Walker et al. |
| 2003/0065805 A1 | 4/2003 | Barnes, Jr. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087652 A1 | 5/2003 | Simon et al. |
| 2003/0087701 A1 | 5/2003 | Paravia et al. |
| 2003/0104851 A1 | 6/2003 | Merari |
| 2003/0104865 A1 | 6/2003 | Itkis et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0130032 A1 | 7/2003 | Martinek et al. |
| 2003/0139190 A1 | 7/2003 | Steelberg |
| 2003/0140131 A1 | 7/2003 | Chandrashekhar |
| 2003/0144047 A1 | 7/2003 | Sprogis |
| 2003/0148809 A1 | 8/2003 | Nelson |
| 2003/0148812 A1 | 8/2003 | Paulsen et al. |
| 2003/0157976 A1 | 8/2003 | Simon |
| 2003/0162580 A1 | 8/2003 | Cousineau |
| 2003/0162593 A1 | 8/2003 | Griswold et al. |
| 2003/0162594 A1 | 8/2003 | Rowe |
| 2003/0173408 A1 | 9/2003 | Mosher et al. |
| 2003/0176162 A1 | 9/2003 | Planki |
| 2003/0176218 A1 | 9/2003 | Lemay |
| 2003/0177187 A1 | 9/2003 | Levine et al. |
| 2003/0177347 A1 * | 9/2003 | Schneier et al. ............. 713/151 |
| 2003/0190944 A1 | 10/2003 | Manfredi et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |

(56) References Cited

U.S. PATENT DOCUMENTS

| | | |
|---|---|---|
| 2003/0208684 A1 | 11/2003 | Camacho et al. |
| 2003/0212996 A1 | 11/2003 | Wolzien |
| 2003/0224855 A1 | 12/2003 | Cunningham |
| 2003/0228895 A1 | 12/2003 | Edelson |
| 2003/0228898 A1 | 12/2003 | Rowe |
| 2003/0228901 A1 | 12/2003 | Walker et al. |
| 2003/0228907 A1 | 12/2003 | Gatto et al. |
| 2003/0228910 A1 | 12/2003 | Jawaharla et al. |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0009812 A1 | 1/2004 | Scott et al. |
| 2004/0014522 A1 | 1/2004 | Walker et al. |
| 2004/0029635 A1 | 2/2004 | Giobbi |
| 2004/0029638 A1 | 2/2004 | Hytchenson |
| 2004/0034775 A1 | 2/2004 | Desjardins et al. |
| 2004/0038734 A1 | 2/2004 | Adams |
| 2004/0043763 A1 | 3/2004 | Minear |
| 2004/0044774 A1 | 3/2004 | Mangalik et al. |
| 2004/0048613 A1 | 3/2004 | Sayers |
| 2004/0053692 A1 | 3/2004 | Chatingny et al. |
| 2004/0061646 A1 | 4/2004 | Andrews et al. |
| 2004/0063497 A1 | 4/2004 | Gould |
| 2004/0066296 A1 | 4/2004 | Atherton |
| 2004/0068441 A1 | 4/2004 | Werbitt |
| 2004/0068532 A1 | 4/2004 | Dewing |
| 2004/0083394 A1* | 4/2004 | Brebner et al. ............... 713/202 |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Koti |
| 2004/0104845 A1 | 6/2004 | McCarthy |
| 2004/0110565 A1 | 6/2004 | Levesque |
| 2004/0111369 A1 | 6/2004 | Lane et al. |
| 2004/0118930 A1 | 6/2004 | Berardi et al. |
| 2004/0127277 A1 | 7/2004 | Walker et al. |
| 2004/0127289 A1 | 7/2004 | Davis |
| 2004/0132530 A1 | 7/2004 | Rutanen |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0162124 A1 | 8/2004 | Barton |
| 2004/0162144 A1 | 8/2004 | Loose |
| 2004/0185881 A1 | 9/2004 | Lee et al. |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198398 A1 | 10/2004 | Amir et al. |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2004/0242297 A1 | 12/2004 | Walker |
| 2004/0242332 A1 | 12/2004 | Walker et al. |
| 2004/0243504 A1 | 12/2004 | Asher et al. |
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0266533 A1 | 12/2004 | Gentles et al. |
| 2005/0001711 A1 | 1/2005 | Doughty et al. |
| 2005/0003881 A1 | 1/2005 | Byng |
| 2005/0003888 A1 | 1/2005 | Asher et al. |
| 2005/0003893 A1 | 1/2005 | Hogwood et al. |
| 2005/0009600 A1 | 1/2005 | Rowe et al. |
| 2005/0014554 A1 | 1/2005 | Walker et al. |
| 2005/0020336 A1 | 1/2005 | Cesare |
| 2005/0020340 A1 | 1/2005 | Cannon |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049022 A1 | 3/2005 | Mullen |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0071481 A1 | 3/2005 | Danieli |
| 2005/0086301 A1 | 4/2005 | Eichler et al. |
| 2005/0090294 A1 | 4/2005 | Narasimhan |
| 2005/0096109 A1 | 5/2005 | McNutt et al. |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0107156 A1 | 5/2005 | Potts et al. |
| 2005/0108365 A1 | 5/2005 | Becker et al. |
| 2005/0113172 A1 | 5/2005 | Gong |
| 2005/0116020 A1 | 6/2005 | Smolucha et al. |
| 2005/0130677 A1 | 6/2005 | Meunier et al. |
| 2005/0130728 A1 | 6/2005 | Nguyen |
| 2005/0131815 A1 | 6/2005 | Fung et al. |
| 2005/0137014 A1 | 6/2005 | Vetelainen |
| 2005/0143169 A1 | 6/2005 | Nguyen et al. |
| 2005/0144484 A1 | 6/2005 | Wakayama |
| 2005/0159212 A1 | 7/2005 | Romney et al. |
| 2005/0170845 A1 | 8/2005 | Moran |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Miller |
| 2005/0187020 A1 | 8/2005 | Amaitis et al. |
| 2005/0190901 A1 | 9/2005 | Oborn et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0245306 A1 | 11/2005 | Asher et al. |
| 2005/0245308 A1 | 11/2005 | Amaitis et al. |
| 2005/0251440 A1 | 11/2005 | Bednarek |
| 2005/0261061 A1 | 11/2005 | Nguyen et al. |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0035707 A1 | 2/2006 | Nguyen et al. |
| 2006/0040717 A1 | 2/2006 | Lind et al. |
| 2006/0040741 A1 | 2/2006 | Griswold et al. |
| 2006/0052153 A1 | 3/2006 | Vlazny et al. |
| 2006/0058102 A1* | 3/2006 | Nguyen et al. ................ 463/39 |
| 2006/0068917 A1 | 3/2006 | Snoddy et al. |
| 2006/0069711 A1 | 3/2006 | Tsunekawa et al. |
| 2006/0076406 A1 | 4/2006 | Frerking |
| 2006/0093142 A1* | 5/2006 | Schneier et al. ............... 380/251 |
| 2006/0095790 A1 | 5/2006 | Nguyen et al. |
| 2006/0100019 A1 | 5/2006 | Hornik et al. |

(56) References Cited

U.S. PATENT DOCUMENTS

| | | |
|---|---|---|
| 2006/0106736 A1 | 5/2006 | Jung |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0121987 A1 | 6/2006 | Bortnik et al. |
| 2006/0121992 A1 | 6/2006 | Bortnik et al. |
| 2006/0131391 A1 | 6/2006 | Penuela |
| 2006/0135252 A1 | 6/2006 | Amaitis et al. |
| 2006/0135259 A1 | 6/2006 | Nancke-Krogh et al. |
| 2006/0136296 A1 | 6/2006 | Amada |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0173754 A1 | 8/2006 | Burton et al. |
| 2006/0178216 A1 | 8/2006 | Shea et al. |
| 2006/0183522 A1 | 8/2006 | Leen et al. |
| 2006/0184417 A1 | 8/2006 | Van der Linden et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0199649 A1 | 9/2006 | Soltys et al. |
| 2006/0205489 A1 | 9/2006 | Carpenter et al. |
| 2006/0205497 A1 | 9/2006 | Wells et al. |
| 2006/0209810 A1 | 9/2006 | Krzyzanowski et al. |
| 2006/0224046 A1 | 10/2006 | Ramadas et al. |
| 2006/0229520 A1 | 10/2006 | Yamashita |
| 2006/0234631 A1 | 10/2006 | Dieguez |
| 2006/0234791 A1 | 10/2006 | Nguyen et al. |
| 2006/0236395 A1 | 10/2006 | Barker et al. |
| 2006/0246990 A1 | 11/2006 | Downes |
| 2006/0247026 A1 | 11/2006 | Walker et al. |
| 2006/0247039 A1 | 11/2006 | Lerner et al. |
| 2006/0247041 A1 | 11/2006 | Walker et al. |
| 2006/0247053 A1 | 11/2006 | Mattila |
| 2006/0252501 A1 | 11/2006 | Little et al. |
| 2006/0252530 A1 | 11/2006 | Oberberger et al. |
| 2006/0258429 A1 | 11/2006 | Manning et al. |
| 2006/0277098 A1 | 12/2006 | Chung et al. |
| 2006/0277308 A1 | 12/2006 | Morse et al. |
| 2006/0277413 A1 | 12/2006 | Drews |
| 2006/0281541 A1 | 12/2006 | Nguyen et al. |
| 2006/0287092 A1 | 12/2006 | Walker et al. |
| 2006/0287098 A1 | 12/2006 | Morrow et al. |
| 2006/0293965 A1 | 12/2006 | Burton |
| 2007/0001841 A1 | 1/2007 | Anders et al. |
| 2007/0003034 A1 | 1/2007 | Schultz et al. |
| 2007/0015564 A1 | 1/2007 | Walker et al. |
| 2007/0021213 A1 | 1/2007 | Foe et al. |
| 2007/0026939 A1 | 2/2007 | Asher et al. |
| 2007/0030154 A1 | 2/2007 | Aiki et al. |
| 2007/0032301 A1 | 2/2007 | Acres et al. |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0066401 A1 | 3/2007 | Amaitis |
| 2007/0066402 A1 | 3/2007 | Amaitis |
| 2007/0087834 A1 | 4/2007 | Moser et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0130044 A1 | 6/2007 | Rowan |
| 2007/0136817 A1 | 6/2007 | Nguyen |
| 2007/0167237 A1 | 7/2007 | Wang et al. |
| 2007/0168570 A1* | 7/2007 | Martin et al. .................. 710/8 |
| 2007/0181676 A1 | 8/2007 | Mateen et al. |
| 2007/0190494 A1 | 8/2007 | Rosenberg |
| 2007/0191719 A1 | 8/2007 | Yamashita et al. |
| 2007/0213120 A1 | 9/2007 | Beal et al. |
| 2007/0233585 A1 | 10/2007 | Ben Simon et al. |
| 2007/0235807 A1 | 10/2007 | Sobel et al. |
| 2007/0238443 A1 | 10/2007 | Richardson |
| 2007/0241187 A1 | 10/2007 | Alderucci et al. |
| 2007/0243927 A1 | 10/2007 | Soltys |
| 2007/0243935 A1 | 10/2007 | Huizinga |
| 2007/0257101 A1 | 11/2007 | Alderucci et al. |
| 2007/0258507 A1 | 11/2007 | Lee et al. |
| 2007/0259717 A1 | 11/2007 | Mattice et al. |
| 2007/0275779 A1 | 11/2007 | Amaitis |
| 2007/0281782 A1 | 12/2007 | Amaitis |
| 2007/0281785 A1 | 12/2007 | Amaitis |
| 2007/0281792 A1 | 12/2007 | Amaitis |
| 2007/0282959 A1 | 12/2007 | Stern |
| 2008/0004121 A1 | 1/2008 | Gatto et al. |
| 2008/0009344 A1 | 1/2008 | Graham et al. |
| 2008/0015013 A1 | 1/2008 | Gelman et al. |
| 2008/0022089 A1 | 1/2008 | Leedom |
| 2008/0026829 A1 | 1/2008 | Martin et al. |
| 2008/0026844 A1 | 1/2008 | Wells et al. |
| 2008/0032801 A1 | 2/2008 | Brunet de Courssou |
| 2008/0039196 A1 | 2/2008 | Walther et al. |
| 2008/0051193 A1 | 2/2008 | Kaminkow et al. |
| 2008/0066111 A1 | 3/2008 | Ellis et al. |
| 2008/0076505 A1 | 3/2008 | Nguyen et al. |
| 2008/0076506 A1 | 3/2008 | Nguyen et al. |
| 2008/0076572 A1 | 3/2008 | Nguyen et al. |
| 2008/0096628 A1 | 4/2008 | Czyzewski et al. |
| 2008/0096659 A1 | 4/2008 | Kreloff et al. |
| 2008/0102956 A1 | 5/2008 | Burman et al. |
| 2008/0102957 A1 | 5/2008 | Burman et al. |
| 2008/0108423 A1 | 5/2008 | Benbrahim et al. |
| 2008/0113785 A1 | 5/2008 | Alderucci et al. |
| 2008/0113786 A1 | 5/2008 | Alderucci et al. |
| 2008/0113816 A1 | 5/2008 | Mahaffey et al. |
| 2008/0132251 A1 | 6/2008 | Altman et al. |
| 2008/0139306 A1 | 6/2008 | Lutnick |
| 2008/0146323 A1 | 6/2008 | Hardy et al. |
| 2008/0150678 A1 | 6/2008 | Giobbi et al. |
| 2008/0167106 A1 | 7/2008 | Lutnick et al. |
| 2008/0182644 A1 | 7/2008 | Lutnick et al. |
| 2008/0195664 A1 | 8/2008 | Maharajh et al. |
| 2008/0207302 A1 | 8/2008 | Lind et al. |
| 2008/0214261 A1 | 9/2008 | Alderucci et al. |
| 2008/0218312 A1 | 9/2008 | Asher et al. |
| 2008/0220871 A1 | 9/2008 | Asher et al. |
| 2008/0221396 A1 | 9/2008 | Graces et al. |
| 2008/0224822 A1 | 9/2008 | Asher et al. |
| 2008/0254897 A1 | 10/2008 | Saunders et al. |
| 2008/0305856 A1 | 12/2008 | Walker et al. |
| 2008/0306867 A1 | 12/2008 | Guthrie |
| 2008/0311994 A1 | 12/2008 | Amaitis et al. |
| 2008/0318670 A1 | 12/2008 | Zinder et al. |
| 2009/0049542 A1* | 2/2009 | DeYonker et al. .................. 726/18 |
| 2009/0055204 A1 | 2/2009 | Pennington et al. |
| 2009/0088232 A1 | 4/2009 | Amaitis et al. |
| 2009/0098925 A1 | 4/2009 | Gagner et al. |
| 2009/0117989 A1 | 5/2009 | Arezina et al. |
| 2009/0149233 A1 | 6/2009 | Strause et al. |
| 2009/0163272 A1 | 6/2009 | Baker et al. |
| 2009/0178118 A1 | 7/2009 | Cedo et al. |
| 2009/0183208 A1 | 7/2009 | Christensen et al. |
| 2009/0197684 A1 | 8/2009 | Arezina et al. |
| 2009/0204905 A1 | 8/2009 | Toghia |
| 2009/0209233 A1 | 8/2009 | Morrison |
| 2009/0312032 A1 | 12/2009 | Bornstein et al. |
| 2009/0325708 A9* | 12/2009 | Kerr .................. 463/42 |
| 2010/0023372 A1 | 1/2010 | Gonzalez |
| 2010/0062834 A1* | 3/2010 | Ryan .................. 463/25 |
| 2010/0069158 A1 | 3/2010 | Kim |
| 2010/0075760 A1 | 3/2010 | Shimabukuro et al. |
| 2010/0113143 A1 | 5/2010 | Gagner et al. |
| 2010/0127919 A1 | 5/2010 | Curran et al. |
| 2010/0153511 A1 | 6/2010 | Lin |
| 2010/0205255 A1 | 8/2010 | Alderucci |

(56) References Cited

U.S. PATENT DOCUMENTS

| | | |
|---|---|---|
| 2010/0211431 A1 | 8/2010 | Lutnick |
| 2010/0227691 A1 | 9/2010 | Karsten |
| 2010/0240455 A1 | 9/2010 | Gagner et al. |
| 2011/0269520 A1 | 11/2011 | Amaitis et al. |
| 2012/0190452 A1 | 7/2012 | Weston et al. |
| 2013/0005486 A1 | 1/2013 | Amaitis et al. |
| 2013/0065672 A1 | 3/2013 | Gelman et al. |
| 2013/0065679 A1 | 3/2013 | Gelman et al. |
| 2013/0072295 A1 | 3/2013 | Alderucci et al. |
| 2013/0084933 A1 | 4/2013 | Amaitis et al. |
| 2013/0165212 A1 | 6/2013 | Amaitis et al. |
| 2013/0165213 A1 | 6/2013 | Alderucci et al. |
| 2013/0165221 A1 | 6/2013 | Alderucci et al. |
| 2013/0178277 A1 | 7/2013 | Burman et al. |
| 2013/0210513 A1 | 8/2013 | Nguyen |
| 2013/0244742 A1 | 9/2013 | Amaitis et al. |
| 2014/0057724 A1 | 2/2014 | Alderucci et al. |
| 2014/0113707 A1 | 4/2014 | Asher et al. |
| 2014/0200465 A1 | 7/2014 | McIntyre |
| 2014/0220514 A1 | 8/2014 | Waldron et al. |
| 2014/0228127 A1 | 8/2014 | Alderucci et al. |
| 2014/0288401 A1 | 9/2014 | Ouwekerk |
| 2014/0300491 A1 | 10/2014 | Chen |
| 2015/0080111 A1 | 3/2015 | Amaitis et al. |
| 2015/0141131 A1 | 5/2015 | Gelman et al. |
| 2015/0243135 A1 | 8/2015 | Lutnick et al. |

FOREIGN PATENT DOCUMENTS

| | | |
|---|---|---|
| DE | 37 36 770 A1 | 5/1989 |
| DE | 43 16 652 A1 | 11/1994 |
| DE | 19922862 | 12/2000 |
| DE | 19944140 | 3/2001 |
| DE | 19952691 | 5/2001 |
| DE | 19952692 | 5/2001 |
| DE | 10060079 | 6/2002 |
| EP | 0 840 639 B1 | 7/1996 |
| EP | 0 506 873 B1 | 3/2000 |
| EP | 1045346 | 10/2000 |
| EP | 1063622 | 12/2000 |
| EP | 1 066 868 A2 | 1/2001 |
| EP | 1066867 | 1/2001 |
| EP | 1120757 | 1/2001 |
| EP | 1 202 528 A3 | 5/2002 |
| EP | 1217792 | 6/2002 |
| EP | 1231577 | 8/2002 |
| EP | 1291830 A2 | 3/2003 |
| EP | 1 475 755 A1 | 12/2003 |
| EP | 1 475 756 A2 | 11/2004 |
| EP | 1480102 A2 | 11/2004 |
| EP | 1 531 646 A1 | 5/2005 |
| EP | 1259930 B1 | 6/2005 |
| EP | 1480102 A3 | 10/2008 |
| GB | 2 248 404 | 4/1992 |
| GB | 2 256 594 | 12/1992 |
| GB | 2 391 432 | 2/2004 |
| GB | 2 391 767 | 2/2004 |
| GB | 2394675 | 5/2004 |
| GB | 2 406 291 | 3/2005 |
| JP | H11-220766 | 1/1988 |
| JP | 5-317485 | 12/1993 |
| JP | H07-281780 | 10/1995 |
| JP | 2000-69540 | 8/1998 |
| JP | 2000049046 | 2/2000 |
| JP | 2000-160016 | 6/2000 |
| JP | 200218125 | 7/2000 |
| JP | 200326491 | 10/2000 |
| JP | 200345435 | 11/2000 |
| JP | 200387614 | 12/2000 |
| JP | 2001-70658 | 3/2001 |
| JP | 2001-204971 | 7/2001 |
| JP | 2001-204972 | 7/2001 |
| JP | 2001/212363 | 8/2001 |
| JP | 2001 236458 | 8/2001 |
| JP | 2001-340656 | 12/2001 |
| JP | 2001-344400 | 12/2001 |
| JP | 2001-526550 | 12/2001 |
| JP | 2002 032515 | 1/2002 |
| JP | 2002-049681 | 2/2002 |
| JP | 2002-056270 | 2/2002 |
| JP | 2002107224 | 2/2002 |
| JP | 2002-661444 | 3/2002 |
| JP | 2002-109376 | 4/2002 |
| JP | 2002-66144 | 5/2002 |
| JP | 2002 133009 | 5/2002 |
| JP | 2002-135468 | 5/2002 |
| JP | 2002-175296 | 6/2002 |
| JP | 2002 189831 | 7/2002 |
| JP | 2002-253666 | 9/2002 |
| JP | 2002-263375 | 9/2002 |
| JP | 2002-292113 | 10/2002 |
| JP | 2003-053042 | 2/2003 |
| JP | 2003-062353 | 3/2003 |
| JP | 2003 078591 | 3/2003 |
| JP | 2003-518677 | 6/2003 |
| JP | 2003166050 | 6/2003 |
| JP | 2003-210831 | 7/2003 |
| JP | 2003-210852 | 7/2003 |
| JP | 2003 228642 | 8/2003 |
| JP | 2002024979 | 8/2003 |
| JP | 2002 149894 | 5/2004 |
| JP | 2004-261202 | 9/2004 |
| JP | 2004-321558 | 11/2004 |
| JP | 2004-536638 | 12/2004 |
| JP | 2005 005936 | 1/2005 |
| JP | 2005-073711 | 3/2005 |
| JP | 2006-072468 | 3/2006 |
| JP | 2007-011420 | 1/2007 |
| RU | 2190477 | 10/2002 |
| WO | WO 80/02512 A1 | 11/1980 |
| WO | WO93/10508 | 5/1993 |
| WO | WO 94/10658 | 5/1994 |
| WO | WO 94/16416 | 7/1994 |
| WO | WO 95/24689 A1 | 9/1995 |
| WO | WO 95/30944 | 11/1995 |
| WO | WO 96/00950 A1 | 1/1996 |
| WO | WO 96/15837 A1 | 5/1996 |
| WO | WO 97/44750 | 11/1997 |
| WO | WO 98/09694 A1 | 3/1998 |
| WO | WO 99/04873 A1 | 2/1999 |
| WO | WO 99/08762 A1 | 2/1999 |
| WO | WO 99/19027 | 4/1999 |
| WO | WO 99/42964 | 8/1999 |
| WO | WO 99/52077 | 10/1999 |
| WO | WO 99/55102 | 10/1999 |
| WO | WO 00/77753 A1 | 12/2000 |
| WO | 01/20538 | 3/2001 |
| WO | WO 01/17262 A1 | 3/2001 |
| WO | WO 01/40978 A2 | 6/2001 |
| WO | WO 01/48712 A1 | 7/2001 |
| WO | WO 01/48713 | 7/2001 |
| WO | WO 01/48713 A1 | 7/2001 |
| WO | WO 01/54091 | 7/2001 |
| WO | 01/67218 | 9/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/31739 | 4/2002 |
| WO | WO 02/37246 | 5/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |
| WO | WO 02/077931 A1 | 10/2002 |
| WO | WO02/101486 | 12/2002 |
| WO | WO 02/101486 A3 | 12/2002 |
| WO | WO 03/005743 | 1/2003 |
| WO | 03/015299 A1 | 2/2003 |
| WO | WO 03/013678 A1 | 2/2003 |
| WO | WO 03/015299 | 2/2003 |

(56) References Cited

FOREIGN PATENT DOCUMENTS

| WO | WO 03/021543 | 3/2003 | |
|---|---|---|---|
| WO | WO 03/027970 A2 | 4/2003 | |
| WO | 03/045519 | 6/2003 | |
| WO | 03/081447 | 10/2003 | |
| WO | WO 2004/000428 A1 | 12/2003 | |
| WO | WO 2004/003810 A1 | 1/2004 | |
| WO | WO 2004/013820 | 2/2004 | |
| WO | WO 2004/014506 A1 | 2/2004 | |
| WO | WO 2004/023253 A3 | 3/2004 | |
| WO | 2004/027689 A2 | 4/2004 | |
| WO | WO 2004/027689 | 4/2004 | |
| WO | WO 2004/034223 | 4/2004 | |
| WO | WO 2004/073812 A2 | 9/2004 | |
| WO | WO 2004/095383 | 11/2004 | |
| WO | WO 2004/104763 A2 | 12/2004 | |
| WO | WO 2004/114235 A1 | 12/2004 | |
| WO | WO 2005/001651 | 1/2005 | |
| WO | WO 2005/015458 A1 | 2/2005 | |
| WO | WO 2005/022453 | 3/2005 | |
| WO | WO 2005/026870 A2 | 3/2005 | |
| WO | WO 2005/031627 A1 | 4/2005 | |
| WO | WO 2005/031666 A1 | 4/2005 | |
| WO | WO 2005/036425 A1 | 4/2005 | |
| WO | WO 2005/050574 A2 | 6/2005 | |
| WO | WO 2005/082011 | 9/2005 | |
| WO | WO 2005/085980 | 9/2005 | |
| WO | WO2005/098650 | 10/2005 | |
| WO | WO 2005098650 | 10/2005 | |
| WO | WO 2005098650 A1 * | 10/2005 | ........................ 1/57 |
| WO | 2006/023230 | 3/2006 | |
| WO | WO 2007/008601 A2 | 1/2007 | |
| WO | WO97/19537 | 5/2007 | |
| WO | WO 2008/005264 | 1/2008 | |
| WO | WO 2008/016610 | 2/2008 | |

OTHER PUBLICATIONS

U.S. Appl. No. 11/559,484, filed Nov. 14, 2006 in the name of Alderucci et al.
U.S. Appl. No. 11/559,829, filed Nov. 14, 2006 in the name of Alderucci et al.
U.S. PTO Office Action for U.S. Appl. No. 11/683,508; 10 pages; Apr. 15, 2010.
Notice of Allowance for U.S. Appl. No. 11/256,568; 18 pages; Jun. 7, 2010.
U.S. PTO Office Action for U.S. Appl. No. 11/685,997; May 12, 2010; 11 pages.
U.S. PTO Office Action for U.S. Appl. No. 11/681,443; 11pages; Jan. 11, 2010.
Notice of Allowability for U.S. Appl. No. 11/199,835; Apr. 10, 2010; 2 pages.
Notice of Panel Decision for U.S. Appl. No. 11/553,142; 2 pages; Feb. 3, 2010.
Notice of Panel Decision for U.S. Appl. No. 11/553,130; 2 pages; May 13, 2010.
Office Action for Japanese Patent Application No. 2007-500972; Feb. 23, 2010; 3 pages; with translation 3 pages.
Office Action for Japanese Patent Application No. 2007-556420; Feb. 23, 2010; 4 pages; with translation 4 pages.
AU Examination Report for AU Application No. 2006269413; 2 pages; Apr. 29, 2009.
Notice of Acceptance for AU Application No. 2006269420 ; 16 pages; May 3, 2010.
AU Examination Report for AU Application No. 2006269413; 2 pages; Sep. 7, 2009.
Canadian Examination Report for CA Application No. 2613335; 4 pages; Oct. 13, 2009.
Office Action for Japanese Patent Application No. 2008-520419 ; Feb. 2, 2010; 8 pages; with translation 8 pages.
AU Examination Report for AU Application No. 2008239516; 3 pages; May 14, 2010.
AU Examination Report for AU Application No. 2008201005; 3 pages; Aug. 11, 2009.
AU Examination Report for AU Application No. 2007216729; 5 pages; Dec. 3, 2008.
U.S. PTO office Action for U.S. Appl. No. 11/559,829; 29 pages; Jun. 22, 2010.
Pending U.S. Appl. No. 10/835,995 entitled *System and Method for a Convenience Gaming* by Lee M. Amaitis, et al., filed Apr. 29, 2004.
Pending U.S. Appl. No. 11/063,311 entitled *System and Method for Convenience Gaming* by Lee M. Amaitis, et al., filed Feb. 21, 2005.
Solutions for Restaurants, Hotels & Resorts and Clubs—Guestbridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.
Notification of Transmittal of the International Search Report and the Written Opinion of the International Searching Authority, or the Declaration for International Application No. PCT/US08/56120, 14 pages, Aug. 29, 2008.
Pending U.S. Appl. No. 11/839,404, filed Aug. 15, 2007.
Pending U.S. Appl. No. 11/839,412, filed Aug. 15, 2007.
Pending U.S. Appl. No. 11/683,476, filed Mar. 8, 2007.
Pending U.S. Appl. No. 11/683,508, filed Mar. 8, 2007.
Pending U.S. Appl. No. 11/685,999, filed Mar. 14, 2007.
Pending U.S. Appl. No. 12/197,809, filed Aug. 25, 2008.
U.S. PTO Office Action for U.S. Appl. No. 11/256,568; 17 pages; Oct. 21, 2008.
U.S. Appl. No. 11/686,354, filed Mar. 15, 2007, entitled "Game Access Device with Time Varying Signal."
Office Action for Pending U.S. Appl. No. 11/063,311 entitled System and Method for Convenience Gaming by Lee M. Amaitis, et al.; Jul. 10, 2008.
United States Patent and Trademark Office: Office Action for U.S. Appl. No. 11/199,835, filed Aug. 9, 2005; in the name of Lee M. Amaitis,; 17 pages; Mar. 2, 2007.
Australian Patent Office Written Opinion and Search Report for Application No. SG 200605830-9; 11 pages; Nov. 29, 2007.
Notification of Transmittal of the International Search Report and the Written Opinion of the International Searching Authority for International Application No. PCT/US06/26348; 9 pages; Dec. 28, 2007.
United States Patent and Trademark Office: Office Action for U.S. Appl. No. 11/063,311, filed Feb. 21, 2005, in the name of Lee M. Amaitis; 18 pages; May 4, 2007.
United States Patent and Trademark Office: Office Action for U.S. Appl. No. 11/063,311, filed Feb. 21, 2005 in the name of Lee M. Amaitis; 27 pages; Oct. 31, 2007.
Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.
Notification of Transmittal of the International Search Report and the Written Opinion of the International Searching Authority for International Application PCT/US06/26599; 7 pages; Sep. 24, 2007.
Notification of Transmittal of the International Search Report and the Written Opinion of the International Searching Authority for International Application PCT/US06/06315; 10 pages; Sep. 24, 2007.
USPTO Office Action Summary for U.S. Appl. No. 11/201,812, filed Aug. 10, 2005; 32pages; Sep. 27, 2007.
Stephan Neuert, et al.; The British Library; *Delivering Seamless Mobile Services Over Bluetooth*; 11 pages; date unknown.
Business Wire; Home Gambling Network Inc., With U.S. Pat. No. 5,800,268—Business/Gambling—HGN and UUNET, a WorldCom/MCI Company, *Reach a Mutually Satisfactory Resolution in Patent Suit*; 2 pages; Mar. 19, 1999.
PR Newswire; Nokia N-Gage (TM) Mobile Game Deck—The Revolutionary Gaming Experience; *Major Global Games Publishers Excited to Publish on Wireless Multiplayer Platform*; 3 pages; Feb. 6, 2003.
Business Wire; GoldPocket Interactive Launches EM Mobile Matrix, *Industry's First Fully Synchronous Interactive Television and Massively Multi-Player Gaming Solution*; 2 pages; Mar. 17, 2003.

(56) References Cited

OTHER PUBLICATIONS

Brand Strategy; The National Lottery has announced that UK consumers will be able to purchase tickets using the internet, *TV and Mobile phones*. (Launches & Rebrands); ISSN 0965-9390; 1 page; Apr. 00, 2003.
PR Newswire; Ideaworks3D appointed by Eidos Interactive to Develop Blockbuster Line-up for *Nokia N-Gage Mobile Game Deck*; 2 pages; May 23, 2003.
Telecomworldwire; *New mobile lottery service launched by mLotto*; 1 page; Oct. 30, 2003.
Singh, et al.; *Anywhere, Any-Device Gaming*; Human Interface Technology Laboratory; National University of Singapore; 4 pages; 2004.
Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.
*Precision Marketing*; vol. 16, No. 11; ISSN 0955-0836; 2 pages; Jan. 9, 2004.
Online Reporter; *GTECH Takes Lottery Mobile*; 1 page; Feb. 28, 2004.
Personal and Ubiquitous Computing; *Human Pacman: a mobile, wide-area entertainment system based on physical, social, and ubiquitous computing*; 12 pages; May 2004.
PR Newswire; *M7 Networks Partners With Terraplay to Deliver Real-Time Multiplayer Gaming Functionality to Its Community Services Offerings*; 2 pages; Jun. 1, 2004.
China Telecom; *Win Win Gaming Inc. announces agreement to provide wireless lottery and entertainment content in Shanghai*; vol. 11, No. 9; 2 pages; Sep. 00, 2004.
Business Wire; EA Announces Next Step Into Mobile Gaming; *Digital Bridges Named as Strategic Partner for Distribution of Mobile Interactive Entertainment in Europe, North and South America*; 3 pages; Sep. 2, 2004.
Wireless News; *Mobile Casinos, Lotteries Good News for Mobile Revenues*; 2 pages; Feb. 23, 2005.
Business Wire; MobileGamingNow, Inc. Announces the Launch of the First Ever Mobile Phone Interactive, *Multi-Player Gaming System for Poker*; 2 pages; Apr. 4, 2005.
Business Wire; InfoSpace's Golf Club 3D Scores Hole-in-One for Exciting and Realistic Game Play; InfoSpace's 3D Golf Captures the Challenge and Realism of the Sport With Real-Time 3D Animation, *Weather Effects, and Customizable Characters*; 2 pages; Apr. 21, 2005.
Business Wire; July Systems' Play2Win Interactive Game Service Launched on UK's MobileGaming.com; *Speedy Customer Deployments Now Possible With July's New UK Mobile Retailing Infrastructure*; 2 pages; May 4, 2005.
Pending U.S. Appl. No. 11/199,835 entitled *System and Method for Wireless Gaming System With User Profiles* by Lee M. Amaitis, et al., filed Aug. 9, 2005.
Pending U.S. Appl. No. 11/199,831 entitled *System and Method for Wireless Gaming System With Alerts* by Lee M. Amaitis, et al., filed Aug. 29, 2005.
Pending U.S. Appl. No. 11/199,964 entitled *System and Method for Providing Wireless Gaming as a Service Application* by Lee M. Amaitis, et al., filed Aug. 9, 2005.
Pending U.S. Appl. No. 11/201,812 entitled *System and Method for Wireless Gaming With Location Determination* by Lee M. Amaitis, et al., filed Aug. 10, 2005.
U.S. Appl. No. 12/194,593, Aug. 20, 2008, Lutnick et al.
Pending U.S. Appl. No. 11/210,482 entitled *System and Method for Peer-to-Peer Wireless Gaming* by Lee M. Amaitis, et al., filed Aug. 24, 2005.
Pending U.S. Appl. No. 11/256,568 entitled *System and Method for Wireless Lottery* by Joe M. Asher, et al., filed Oct. 21, 2005.
Pending U.S. Appl. No. 11/557,125 entitled *System and Method for Convenience Gaming* by Lee M. Amaitis, et al., filed Nov. 7, 2006.
Pending U.S. Appl. No. 11/557,131 entitled *System for Convenience Gaming* by Lee M. Amaitis, et al. filed Nov. 7, 2006.
U.S. Appl. No. 11/567,322, filed Dec. 6, 2006, Lutnick et al.
U.S. Appl. No. 11/621,639, filed Jan. 9, 2007, Lutnick et al.

U.S. Appl. No. 12/147,005, filed Jun. 26, 2008, Lutnick et al.
Gaming Labs Certified™; Standard Series; GLI-26: *Wireless Gaming System Standards*; Version: 1.1; 28 pages; Jan. 18, 2007.
Notification of Transmittal of the International Search Report and the Written Opinion of the International Searching Authority, or the Declaration, for International Application No. PCT/US06/26343, 8 pages, Jan. 19, 2007.
Notification of Transmittal of the International Search Report and the Written Opinion of the International Searching Authority, or the Declaration, for International Application No. PCT/US06/26600, 8 pages, Jan. 19, 2007.
Notification of Transmittal of the International Search Report and the Written Opinion of the International Searching Authority, or the Declaration for International Application No. PCT/US06/26346, 8 pages, Mar. 29, 2007.
Notification of Transmittal of the International Search Report and the Written Opinion of the International Searching Authority, or the Declaration for International Application No. PCT/US05/05905, 10 pages, Apr. 10, 2007.
Gaming Labs Certified™; Standard Series; GLI-11: *Gaming Devices in Casinos*; Version: 2.0; 96 pages; Apr. 20, 2007.
Notification of Transmittal of the International Search Report and the Written Opinion of the International Searching Authority, or the Declaration for International Application No. PCT/US06/26350, 8 pages, Apr. 27, 2007.
Gaming Labs Certified™; Standard Series; GLI-21: *Client-Server Systems*; Version: 2.1; 85 pages; May 18, 2007.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
U.S. Appl. No. 11/418, 939, filed May 5, 2006, entitled "Systems and methods for providing access to wireless gaming devices."
U.S. Appl. No. 11/406,783, filed May 5, 2006 entitled "Systems and methods for providing access to wireless gaming devices."
United States Patent and Trademark Office, Office Action for U.S. Appl. No. 11/210,482; 26 pages; Jul. 27, 2007.
Australian Patent Office; Examination Report for Singapore Patent Application No 0605830-9; 5 pages; Jul. 7, 2008.
PCT Notification of Transmittal of the International Search Report and the Written Opinion of the International Searching Authority for International Application No. PCT/US07/66873; 4 pages; Aug. 4, 2008.
PCT Notification of Transmittal of the International Search Report and the Written Opinion of the International Searching Authority for International Application No. PCT/US2008/057239; 8 pages; Aug. 7, 2008.
U.S. PTO Office Action for U.S. Appl. No. 11/199,831; 9 pages; Dec. 19, 2008.
U.S. PTO Office Action for U.S. Appl. No. 10/835,995; 11 pages; Jan. 22, 2009.
U.S. PTO Office Action for U.S. Appl. No. 11/406,783; Feb. 9, 2009.
Australian Examination Report for AU Application 2006269418; 2 pages; Mar. 12, 2009.
U.S. PTO Office Action for U.S. Appl. No. 11/063,311; 14 pages; Apr. 29, 2009.
U.S. PTO Office Action for U.S. Appl. No. 11/210,482; 24 pages; Apr. 29, 2009.
U.S. PTO Office Action for U.S. Appl. No. 11/683,476; 8 pages; Jun. 24, 2009.
U.S. PTO Office Action for U.S. Appl. No. 10/897,822; 7 pages; Jan. 23, 2009.
U.S. PTO Office Action for U.S. Appl. No. 10/897,822; 7 pages; Jul. 16, 2008.
U.S. PTO Office Action for U.S. Appl. No. 10/897,822; 14 pages; Aug. 31, 2007.
U.S. PTO Office Action for U.S. Appl. No. 10/897,822; 16 pages; Feb. 22, 2007.
U.S. PTO Office Action for U.S. Appl. No. 10/897,822; 17 pages; Aug. 5, 2009.
U.S. PTO Office Action for U.S. Appl. No. 10/897,822; 7 pages; Feb. 6, 2008.

(56) References Cited

OTHER PUBLICATIONS

Applicants Response, Claims, Arguments and Remarks dated Apr. 23, 2009 for U.S. Appl. No. 10/897,822; 8 pages.
Applicants Response, Claims, Arguments and Remarks dated Oct. 13, 2008 for U.S. Appl. No. 10/897,822; 14 pages.
Applicants Response, Claims, Arguments and Remarks dated Jun. 4, 2008 for U.S. Appl. No. 10/897,822; 14 pages.
Applicants Response, Claims, Arguments and Remarks dated Nov. 19, 2007 for U.S. Appl. No. 10/897,822; 13 pages.
Applicants Response, Claims, Arguments and Remarks dated May 23, 2007 for U.S. Appl. No. 10/897,822; 17 pages.
Applicants Summary of Interview with Examiner dated Jun. 13, 2007 for U.S. Appl. No. 10/897,822; 2 pages.
EPO Examination Report for EP Application No. 05775503.5-1238 dated Jul. 23, 2007; 5; 5 pages.
Canadian Examination Report for CA Application No. 2613362; 4 pages; Oct. 13, 2009.
PCT International Search Report and Written Opinion for International Application No. PCT/US2005/025722; 051102; 11 pages.
U.S. PTO Office Action for U.S. Appl. No. 11/686,354; Oct. 1, 2009; 9 pages.
Canadian Examination Report for CA Application No. 2613338; 4 pages; Oct. 5, 2009.
Notice of Allowance for U.S. Appl. No. 11/406,783; 6 pages; Sep. 28, 2009.
USPTO Office Action for U.S. Appl. No. 11/553,130, Dec. 24, 2008 (12 pages).
USPTO Office Action for U.S. Appl. No. 11/553,142, Dec. 23, 2008 (11 pages).
USPTO Office Action for U.S. Appl. No. 11/553,130, Oct. 6, 2009 (14 pages).
USPTO Office Action for U.S. Appl. No. 11/553,142, Sep. 3, 2009 (28 pages).
Notice of Allowance for U.S. Appl. No. 11/199,831; 5 pages; Oct. 21, 2009.
U.S. PTO Office Action for U.S. Appl. No. 11/557,131; 7 pages; Sep. 29, 2009.
AU 1st examination report for AU Application No. 2006269267; Feb. 16, 2009; 4 pages.
AU 2nd examination report for AU Application No. 2006269267; Oct. 21, 2009; 5 pages.
U.S. PTO Office Action for U.S. Appl. No. 11/557,125; 10 pages; Nov. 9, 2009.
U.S. PTO Office Action for U.S. Appl. No. 11/199,964; 18 pages; Nov. 30, 2009.
U.S. PTO Office Action for U.S. Appl. No. 11/683,476; 12 pages; Dec. 24, 2009.
International Search Report and Written Opinion for PCT Application PCT/US2010/023579; 13 pages; Apr. 16, 2010.
U.S. Appl. No. 12/367,566, filed Feb. 9, 2009; 47 pages.
U.S. PTO Office Action for U.S. Appl. No. 11/199,964; 15 pages; May 25, 2010.
Notice of Acceptance for AU Application No. 2006269267; 8 pages; May 3, 2010.
Canadian Office Action for CA Application No. 2613084; Mar. 29, 2010; 4 pages.
Notice of Allowance for U.S. Appl. No. 11/686,354; Apr. 29, 2010; 6 pages.
USPTO Office Action for U.S. Appl. No. 11/559,829, mailed Nov. 3, 2009, 23 pp.
USPTO Office Action for U.S. Appl. No. 11/559,484, mailed Nov. 3, 2009, 32 pp.
U.S. PTO Office Action for U.S. Appl. No. 10/897,822; 14 pages; Feb. 4, 2010.
Applicants Response, Claims, Arguments and Remarks dated Dec. 7, 2009 for U.S. Appl. No. 10/897,822; 18 pages.
AU Examination Report for AU Application No. 2007319235; Jul. 6, 2010; 2 pages.
AU Examination Report for AU Application No. 2006269418; 2 pages; Oct. 27, 2009.
AU Examination Report for AU Application No. 2006269416; 4 pages; Jun. 10, 2009.
U.S. PTO Office Action for U.S. Appl. No. 10/835,995; 11 pages; Jul. 12, 2010.
U.S. PTO Office Action for U.S. Appl. No. 11/559,484; 19 pages; Jul. 20, 2010.
U.S. PTO Office Action for U.S. Appl. No. 11/559,933; 37 pages; Jul. 20, 2010.
U.S. PTO Office Action for U.S. Appl. No. 10/395,963; 22 pages; Jul. 2, 2010.
Applicants Response, Claims, Arguments and Remarks dated Mar. 18, 2010 for U.S. Appl. No. 10/395,963; 17 pages.
U.S. PTO Office Action for U.S. Appl. No. 10/395,963; 26 pages; Dec. 18, 2009.
Applicants Response, Claims, Arguments and Remarks dated Oct. 9, 2009 for U.S. Appl. No. 10/395,963; 16 pages.
Applicants Response, Claims, Arguments and Remarks dated Sep. 8, 2009 for U.S. Appl. No. 10/395,963; 17 pages.
U.S. PTO Office Action for U.S. Appl. No. 10/395,963; 18 pages; Jun. 9, 2009.
Applicants Response, Claims, Arguments and Remarks dated May 20, 2009 for U.S. Appl. No. 10/395,963; 15 pages.
Applicants Response, Claims, Arguments and Remarks dated Apr. 21, 2009 for U.S. Appl. No. 10/395,963; 14 pages.
U.S. PTO Office Action for U.S. Appl. No. 10/395,963; 16 pages; Jan. 21, 2009.
Applicants Response, Claims, Arguments and Remarks dated Oct. 21, 2008 for U.S. Appl. No. 10/395,963; 14 pages.
U.S. PTO Office Action for U.S. Appl. No. 10/395,963; 11 pages; Jul. 21, 2008.
Applicants Response, Claims, Arguments and Remarks dated May 9, 2008 for U.S. Appl. No. 10/395,963; 15 pages.
U.S. PTO Office Action for U.S. Appl. No. 10/395,963; 3 pages; Mar. 10, 2008.
U.S. PTO Office Action for U.S. Appl. No. 10/395,963; 13 pages; Jan. 8, 2008.
Applicants Response, Claims, Arguments and Remarks dated Oct. 31, 2007 for U.S. Appl. No. 10/395,963; 14 pages.
U.S. PTO Office Action for U.S. Appl. No. 10/395,963; 12 pages; Sep. 19, 2007.
Applicants Response, Claims, Arguments and Remarks dated Jul. 24, 2007 for U.S. Appl. No. 10/395,963; 18 pages.
U.S. PTO Office Action for U.S. Appl. No. 10/395,963; 12 pages; Mar. 29, 2007.
Applicants Response, Claims, Arguments and Remarks dated Nov. 13, 2006 for U.S. Appl. No. 10/395,963; 19 pages.
Applicants Response, Claims, Arguments and Remarks dated Sep. 8, 2006 for U.S. Appl. No. 10/395,963; 14 pages.
U.S. PTO Office Action for U.S. Appl. No. 10/395,563; 7 pages; May 8, 2006.
US PTO Office Action for U.S. Appl. No. 10/395,988; Jan. 9, 2007; 7 pages.
US PTO Office Action for U.S. Appl. No. 10/395,988; Aug. 15, 2007; 4 pages.
US PTO Office Action for U.S. Appl. No. 10/395,988; Mar. 26, 2008; 4 pages.
US PTO Office Action for U.S. Appl. No. 12/367,566; Jul. 20, 2010; 8 pages.
US PTO Office Action for U.S. Appl. No. 10/395,988; Apr. 28, 2010; 9 pages.
Advisory Action for U.S. Appl. No. 10/395,963; 4 pages; May 4, 2009.
Advisory Action for U.S. Appl. No. 10/395,963; 3 pages; Apr. 8, 2008.
Examiner Interview Summary Record for U.S. Appl. No. 10/395,963; 5 pages; Apr. 7, 2008.
Miscellaneous Communication to Applicant for U.S. Appl. No. 10/395,963; 2 pages; Oct. 11, 2006.
Advisory Action for U.S. Appl. No. 10/395,963; 4 pages; Sep. 17, 2009.
Applicants Response, Claims, Arguments and Remarks dated Jul. 6, 2010 for U.S. Appl. No. 10/897,822; 15 pages.

(56) References Cited

OTHER PUBLICATIONS

Examiner Interview Summary Record for U.S. Appl. No. 10/897,822; 4 pages; 06/132007.
AU Examination Report for AU Application No. 2006216723; 2 pages; Jul. 1, 2010.
UK Office Action for Application No. 0910202.1 dated Dec. 21, 2010; 7 pages.
US Final Office Action for U.S. Appl. No. 13/616,492; 36 pages.
US Final Office Action for U.S. Appl. No. 13/616,588; 31 pages.
US Notice of Allowance for U.S. Appl. No. 13/615,440; 7 pages.
JP Final Notification for Reasons for Refusal for App. No. 2009-506743; May 7, 2014; 4 pages (w/English translation).
US Notice of Allowance for U.S. Appl. No. 13/616,535; May 30, 2014; 11 pages.
US Office Action for U.S. Appl. No. 13/615,981; Jun. 24, 2014; 13 pages.
CA Examiner's Requisition for App. No. 2,754,756; Sep. 3, 2014; 3 pages.
CA Examiner's Requisition for App. No. 2,669,836; Mar. 13, 2015; 4 pages.
CA Examiners Requisition for App. No. 2,754,756; May 12, 2015; 6 pages.
NZ First Examination Report for App. No. 706217; Apr. 9, 2015; 2 pages.
JP Final Decision for App. No. 2012-225097; Jul. 7, 2015; 12 pages (w/English translation).
JP Final Decision for App. No. 2013-165976; Jun. 30, 2015; 6 pages (w/English translation).
EP Communication for App. No. 07760844.6; Jun. 23, 2015; 7 pages.
JP Office Action for Application No. 2014-100471 dated Aug. 18, 2015; 6 pages.
JP Office Action for App. No. 2014-161395; Aug. 25, 2015; 6 pages (w/English translation).
Personal authentication through biometric technologies, Podio et al, IEEE 2002.
Digital Chips for an on-line casino, Castell'a-Roca et al, IEEE 2005.
Australian Examination Report for AU Application No. 2011250750, 3 pages; May 22, 2013.
EP Communication for Application No. 07871467.2; Feb. 22, 2013; 7 pages.
JP Decision to Grant a Patent for Application No. 2008-520391, 4 pages; Jun. 12, 2013; (w/ English translation).
U.S. Notice of Allowance for U.S. Appl. No. 12/647,887; 9 pages; Jun. 7, 2013.
US Office Action for U.S. Appl. No. 13/616,535; Jul. 9, 2013; 11 pages.
U.S. Notice of Allowance for U.S. Appl. No. 12/647,887; 6 pages; Jul. 19, 2013.
Notice of Allowance for U.S. Appl. No. 12/247,623; Aug. 2, 2013; 6 pages.
US Office Action for U.S. Appl. No. 13/616,356; Aug. 15, 2013; 11 pages.
Notice of Allowance for U.S. Appl. No. 11/559,829; Aug. 23, 2013; 10 pages.
US Office Action for U.S. Appl. No. 13/616,588; Aug. 20, 2013; 17 pages.
Notice of Allowance for U.S. Appl. No. 11/559,829; Sep. 12, 2013; 10 pages.
U.S. Final Office Action for U.S. Appl. No. 13/615,440; 10; pages; Sep. 9, 2013.
US Office Action for U.S. Appl. No. 13/615,981; Sep. 13, 2013; 12 pages.
US Office Action for U.S. Appl. No. 13/616,492; Sep. 13, 2013; 13 pages.
US Notice of Allowance for U.S. Appl. No. 12/324,221; Sep. 20, 2013; 8 pages.
AU Examination Report No. 1 for Application No. 2012201974; Oct. 21, 2013; 3 pages.
US Notice of Allowance for U.S. Appl. No. 12/324,269; Oct. 30, 2013; 9 pages.
US Notice of Allowance for U.S. Appl. No. 13/586,142; Nov. 21, 2013; 7 pages.
CA Examination Report for App. No. 2,754,756; Dec. 30, 2013; 3 pages.
US Office Action for U.S. Appl. No. 13/849,690; Jan. 14, 2014; 13 pages.
CA Examination Report for App. No. 2,596,474; Dec. 17, 2013; 2 pages.
NZ Examination Report for App. No. 618654; Dec. 20, 2013; 2 pages.
EP Examination Report for App. No. 06786486.8; Jan. 16, 2014; 5 pages.
EP Examination Report for App. No. 06786483.5; Jan. 16, 2014; 5 pages.
US Office Action for U.S. Appl. No. 11/686,354; Feb. 25, 2014; 10 pages.
AU Examination Report No. 1 for App. No. 2012258503; Feb. 24, 2014; 2 pages.
US Final Office Action for U.S. Appl. No. 13/616,356; Mar. 6, 2014; 13 pages.
CA Examination Report for CA Application No. 2613333; Aug. 30, 2010; 4 pages.
NZ Examination Report for NZ Application No. 577177; Dec. 17, 2010; 2 pages.
CA Examination report for CA Application No. 2596474; Nov. 15, 2010; 6 pages.
UK Office Action for Application No. 0910202.1 dated Dec. 21, 2010, 7 pages.
Notice of Allowance for U.S. Appl. No. 11/686,354: Mar. 3, 2011: 8 pages.
U.S. PTO Office Action for U.S. Appl. No. 12/247,623; 10 pages; Mar. 21, 2011.
Notice of Acceptance for AU Application No. 2006269416 dated Mar. 9, 2011; 3 pages.
Notice of Acceptance for CA Application No. 2613335 dated Apr. 4, 2011; 1 pages.
JP Office Action for Application No. 2008-520391; Feb. 1, 2011; 7 pages total with English Translation.
Notice of Acceptance for AU Application No. 2006269413 dated Feb. 7, 2011; 3 pages.
JP Office Action for Application No. 2008-520389; Jan. 18, 2011; 6 pages total with English Translation.
Notice of Allowance for U.S. Appl. No. 11/559,484; 8 pages; Nov. 23, 2010.
Notice of Allowance for U.S. Appl. No. 11/418,939; 27 pages; Mar. 9, 2009.
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
U.S. PTO Office Action for U.S. Appl. No. 12/324,221; 13 pages; Aug. 10, 2011.
U.S. PTO Office Action for U.S. Appl. No. 12/324,269; 14 pages; Aug. 15, 2011.
U.S. PTO Office Action for U.S. Appl. No. 12/324,355; 14 pages; Aug. 18, 2011.
Notice of Allowance for U.S. Appl. No. 11/559,484; 8 pages; Jun. 20, 2011.
GB Office Action for Application No. GB0910202.1; 4 pages; Jul. 11, 2011.
Notice of Allowance for CA Application No. 2613333; 1 pages; Jul. 20, 2011.
Notice of Allowance for U.S. Appl. No. 12/234,221; 7 pages; Dec. 21, 2011.
Notice of Allowance for U.S. Appl. No. 12/324,269; 7 pages; Dec. 6, 2011.
Notice of Allowance for U.S. Appl. No. 12/324,355; 7 pages; Dec. 12, 2011.
AU Examination Report for Application No. 2011202267; 2 pages; Nov. 30, 2011.

(56) References Cited

OTHER PUBLICATIONS

Notice of Allowance for U.S. Appl. No. 11/559,484; 8 pages; Dec. 13, 2011.
Notice of Allowance for U.S. Appl. No. 12/247,623; Jan. 24, 2012; 8 pages.
U.S. PTO Office Action for U.S. Appl. No. 12/647,887; Jan. 23, 2012; 11 pages.
Notice ot Allowance for U.S. Appl. No. 11/559,829; Jan. 10, 2012; 14 pages.
U.S. PTO Office Action for U.S. Appl. No. 12/792,361; Feb. 13, 2012; 14 pages.
Extended EP Search report for Application No. 07871467.2; Feb. 8, 2012; 8 pages.
U.S. PTO Office Action for U.S. Appl. No. 12/685,381; 8 pages; Feb. 28, 2012.
JP Office Action for Application No. 2008-520389; Jan. 24, 2012; 5 pages (includes English Translation).
AU Examination Report for AU Application No. 2007319235; Mar. 13, 2012; 2 pages.
JP Office Action for Application No. 2008-520391; Apr. 10, 2012; 6 pages total with English Translation.
Notice of Acceptance for AU Application No. 2011202267; 3 pages; Mar. 6, 2012.
Notice of Allowance for U.S. Appl. No. 12/324,269; 9 pages; Mar. 22, 2012.
Notice of Allowance for U.S. Appl. No. 11/559,484; 17 pages; Jun. 1, 2012.
Notice of Allowance for U.S. Appl. No. 11/559,829; May 11, 2012; 10 pages.
AU Examination report for Application No. 2011203051; May 28, 2012; 4 pages.
CA Examination Report for Application No. 2754756; 6 pages; May 29, 2012.
EP Office Actin for Application No. 06786486.8; 5 pages; May 14, 2012.
EP Office Action for Application No. 06786483.5; 7 pages; May 14, 2012.
Notice of Allowance for U.S. Appl. No. 12/324,355; 10 pages; Jun. 15, 2012.
U.S. PTO Office Action for U.S. Appl. No. 12/647.887; Aug. 3, 2012; 9 Pages.
NZ Examination Report for NZ Application No. 577177; Jun. 29, 2012; 2 pages.
Notice of Allowance for U.S. Appl. No. 12/685,381; 7 pages; Sep. 12, 2012.
U.S. PTO Office Action for U.S. Appl. No. 12/792,361; Sep. 26, 2012; 14 pages.
U S. PTO Office Action for U.S. Appl. No. 13/616,356; 8 pages; Dec. 4, 2012.
CA Examination report for CA Application No. 2596474; Mar. 20, 2012; 1 page.
Notice of Allowance for U.S. Appl. No. 11/559,484; 17 pages; Oct. 12, 2012.
U.S. PTO Final Office Action for U.S. Appl. No. 11/559,933; 24 pages; Dec. 6, 2012.
AU Examination Report for AU Application No. 2007319235; Apr. 16, 2012; 2 pages.
Yampoiskiy et al., 2006, "Use of Behavioral Biometrics in intrusion detection and Online Gaming", Biometric technology for Human Identification III, edited by Patrick J. Flynn, Sharath Pankanti, Proc. of SPIE vol. 6202, 62020U-1-10.
NZ Examination Report for NZ Application No. 577177; Oct. 12, 2012; 2 pages.
NZ Examination Report and Notice of Acceptance for NZ Application No. 577177; Nov. 6, 2012; 2 pages.
NZ Examination Report for NZ Application No. 600525; Jun. 14, 2012; 2 pages.
Notice of Allowance for U.S. Appl. No. 11/559,829; Oct. 9, 2012; 9 pages.
Notice of Allowance for U.S. Appl. No. 12/685,381; Jan. 9, 2013; 16 pages.
Notice of Allowance for U.S. Appl. No. 12/324,269; 27 pages; Oct. 17, 2012.
Notice of Allowance for U.S. Appl. No. 12/324,355; 34 pages; Jan. 16, 2013.
Notice of Allowance for U.S. Appl. No. 113/586,142; 8 pages; Dec. 24, 2012.
US PTO Office Action for U.S. Appl. No. 13/615,440; 17 pages; Jan. 15, 2013.
Notice of Allowance for U.S. Appl. No. 12/647,887; 35 pages; Mar. 13, 2013.
JP Office Action for Application No. 2009-506743 dated Jan. 22, 2013; 5 pages.
JP Office Action for Application No. 2009-537329 dated Feb. 26, 2013; 13 pages.
Notice of Allowance for U.S. Appl. No. 11/559,484; 11 pages; Mar. 26, 2013.
JP Office Action for Application No. 2008-520389; Apr. 9, 2013; 5 pages (includes English Translation).
Notice of Allowance for U.S. Appl. No. 11/559,829; Apr. 25, 2013; 13 pages.
AU 1st examination report for AU Application No. 2015203832; May 5, 2016; 5 pages.
JP Office Action for App. No. 2014-100471; Apr. 12, 2016; 4 pages (w/English translation).

* cited by examiner

BIOMETRIC ACCESS SENSITIVITY

RELATED APPLICATIONS

The present application may be considered related to the following U.S. patent applications, each of which is incorporated herein by reference in their entirety for the purpose of enablement and written description: Ser. No. 11/406,783, filed Apr. 18, 2006; Ser. No. 11/403,722, filed on Apr. 12, 2006; Ser. No. 11/397,596, filed on Apr. 3, 2006; Ser. No. 11/335,253, filed on Jan. 18, 2006; Ser. No. 11/335,210, filed on Jan. 18, 2006; Ser. No. 11/334,848, filed on Jan. 18, 2006; Ser. No. 11/256,568, filed on Oct. 21, 2005; Ser. No. 11/210,482, filed on Aug. 24, 2005; Ser. No. 11/201,830, filed on Aug. 10, 2005; Ser. No. 11/201,812, filed on Aug. 10, 2005; Ser. No. 11/199,964, filed on Aug. 9, 2005; Ser. No. 11/199,835, filed on Aug. 9, 2005; Ser. No. 11/199,831, filed on Aug. 9, 2005; Ser. No. 11/190,613, filed on Jul. 26, 2005; Ser. No. 11/172,018, filed on Jun. 29, 2005; Ser. No. 11/171,809, filed on Jun. 29, 2005; Ser. No. 11/076,561, filed on Mar. 9, 2005; Ser. No. 11/063,311, filed on Feb. 21, 2005; Ser. No. 11/032,724, filed on Jan. 10, 2005; Ser. No. 11/022,394, filed on Dec. 22, 2004; Ser. No. 11/021,848, filed on Dec. 22, 2004; Ser. No. 11/018,978, filed on Dec. 21, 2004; Ser. No. 10/983,279, filed on Nov. 5, 2004; Ser. No. 10/963,399, filed on Oct. 12, 2004; Ser. No. 10/879,972, filed on Jun. 28, 2004; Ser. No. 10/836,999, filed on Apr. 29, 2004; Ser. No. 10/836,975, filed on Apr. 29, 2004; Ser. No. 10/836,958, filed on Apr. 29, 2004; Ser. No. 10/836,077, filed on Apr. 29, 2004; Ser. No. 10/835,995, filed on Apr. 29, 2004; Ser. No. 10/822,484, filed on Apr. 12, 2004; Ser. No. 10/816,238, filed on Apr. 1, 2004; Ser. No. 10/798,106, filed on Mar. 10, 2004; Ser. No. 10/784,353, filed on Feb. 23, 2004; Ser. No. 10/771,221, filed on Feb. 3, 2004; Ser. No. 10/771,076, filed on Feb. 3, 2004; Ser. No. 10/759,693, filed on Jan. 15, 2004; Ser. No. 10/687,302, filed on Oct. 14, 2003; Ser. No. 10/667,923, filed on Sep. 22, 2003; Ser. No. 10/667,755, filed on Sep. 22, 2003; Ser. No. 10/654,280, filed on Sep. 3, 2003; Ser. No. 10/651,537, filed on Aug. 29, 2003; Ser. No. 10/616,779, filed on Jul. 10, 2003; Ser. No. 10/453,769, filed on Jun. 3, 2003; Ser. No. 10/453,761, filed on Jun. 3, 2003; Ser. No. 10/410,197, filed on Apr. 10, 2003; Ser. No. 10/404,043, filed on Apr. 2, 2003; Ser. No. 10/287,332, filed on Nov. 1, 2002; Ser. No. 10/194,358, filed on Jul. 12, 2002; Ser. No. 10/194,186, filed on Jul. 12, 2002; Ser. No. 10/194,019, filed on Jul. 12, 2002; Ser. No. 10/194,018, filed on Jul. 12, 2002; Ser. No. 10/193,980, filed on Jul. 12, 2002; Ser. No. 10/193,978, filed on Jul. 12, 2002; Ser. No. 10/193,977, filed on Jul. 12, 2002; Ser. No. 10/193,971, filed on Jul. 12, 2002; Ser. No. 10/193,817, filed on Jul. 12, 2002; Ser. No. 09/846,025, filed on Apr. 30, 2001; Ser. No. 09/378,327, filed on Aug. 20, 1999; and Ser. No. 09/267,865, filed on Mar. 12, 1999.

DETAILED DESCRIPTION OF THE INVENTION

Figure 1:
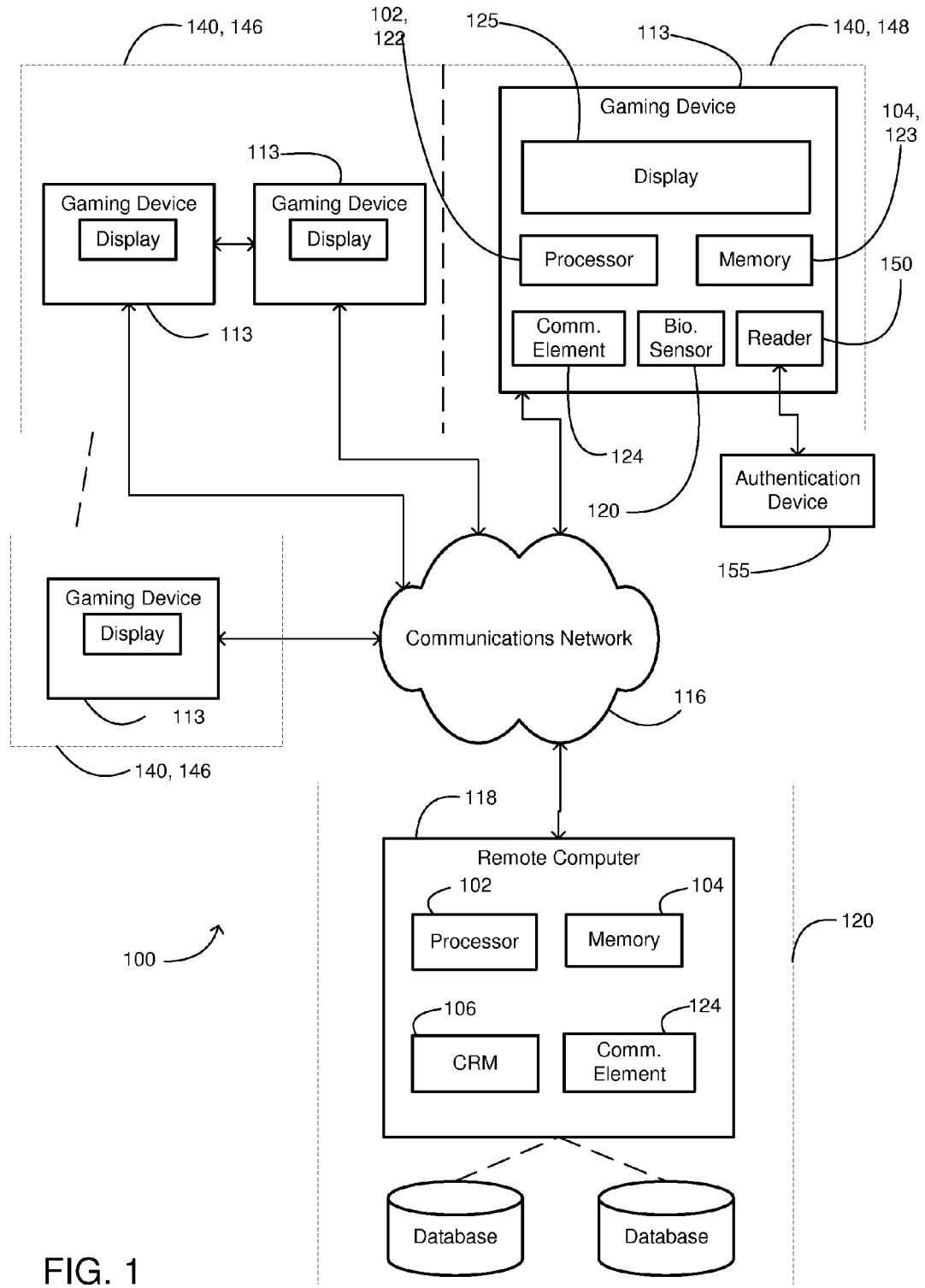
FIG. 1 illustrates a gaming system according to at least one embodiment of the systems disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. 112 Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Overview Of Various Embodiments

Referring to FIG. 1, a gaming system 100 according to at least one embodiment of the systems disclosed herein includes at least one computing device, such as a remote computer 118, e.g., a server computer, a gaming device 113, or a combination thereof, which may reside in whole or in part within the domain of a gaming service provider 120. The gaming provider 120 may be the proprietor of a casino and the gaming system 100 may be physically within the geographic boundaries of the casino. Alternatively, the computing device, e.g., the remote computer 118 and/or the gaming device 113, may be the remote from the casino. As such, the gaming system 100 may allow users to engage in gaming services and access the other services disclosed herein from remote and/or mobile locations relative to the gaming service provider 120 or relative to the casino.

The computing device generally includes at least one processor 102, and a memory 104, such as ROM, RAM, FLASH, etc., or any computer readable medium 106, such as a hard drive, a flash-drive, an optical or magnetic disk, etc. The memory 104 or computer readable medium 106 preferably includes software stored thereon that when executed performs one or more steps of the methods disclosed herein, including communicating data back and forth between devices, displaying interface screens, etc. The computing device may also be associated with or have access to one or more databases for retrieving and storing the various types of data discussed herein, including identity verification data, such as an ID and password, physical biometric data, etc., user continuity data, such as behavioral biometric data, proficiency data, player pattern data, etc., and user profile data, such as the user's names, identification number, address, credit or debit card data, account balances, user preferences, device preferences, etc.

In one embodiment, the system 100 includes a plurality of computing device, such as a remote computer 118 coupled to at least one gaming device 113 over a communication network 116, which are generally configured or otherwise capable of transmitting and/or receiving communications to and/or from each other. The term remote in this context merely means that the remote computer 118 and the gaming device are separate from each other. Thus, the devices may be remote even if the devices are located within the same room. As such, the gaming device 113 is preferably configured or otherwise capable of transmitting and/or receiving communications to and/or from the remote computer 118. This may be accomplished with a communication element 124, such as a modem, an Ethernet interface, a transmitter/receiver, etc., that enables communication with a similarly equipped remote computer 118, wirelessly, wired, or a combination thereof. It is understood that the relative functionality described herein may be provided by the remote computer 118, by the gaming device 113, or both, and is thus not limited to any one implementation discussed herein.

The gaming devices 113 may include, without limitation, a mobile phone, PDA, pocket PC, personal computer, as well as any special or general purpose gaming device, such as a slot machine, a video poker machine, video or computer-based versions of table games, e.g., roulette, blackjack, etc. As such, the gaming device 113 preferably includes a processor 122, a memory 123, a display 125, such as a CRT or an LCD monitor, for displaying information and/or graphics associated with the services provided by the gaming system 100, and at least one input device, such as a mouse, a touch-sensitive pad, a pointer, a stylus, a trackball, a button, e.g., alphanumeric, a scroll wheel, a touch-sensitive monitor, etc., or a combination thereof, for users to enter commands and/or information relevant to the gaming system services. With the general purpose type gaming devices 113, such as the PC or PDA, users may access the services provided by the gaming system 100, e.g., the remote computer 118, with a browser or any other generic application, or with special purpose software designed specifically for accessing and providing the services disclosed herein.

In at least one embodiment, the gaming device 113 includes or is otherwise associated with at least one biometric sensor 120. The biometric sensor 120 is any device that is used to determine directly from the user at least one item of biometric data associated with a user, such as a fingerprint reader, an iris scanner, a retinal scanner, a vascular pattern reader, a facial recognition camera, etc. The biometric sensor 120 may be embodied in hardware, software, or a combination thereof. The biometric sensor 120 may further share resources with other components of the gaming device 113, such as the processor 122, memory 123, a camera, a microphone, a speaker, etc. A single biometric sensor 120 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons. The biometric data is generally obtained with the biometric sensor 120 and used at least to verify the identity of the user as a gateway for allowing the user to access the services provided with the gaming device 113 and/or the remote computer 118. In this regard, biometric data may be compared with previously obtained/stored physical biometric data that has preferably been authenticated as being associated with a particular authorized user, and access to the gaming system's services may be provided based on a positive match thereof.

In addition to the physical biometrics discussed above, the biometric sensor 120 may also obtain behavioral biometric data, such as blood pressure, heart or pulse rate, body temperature data, speech, handwriting, keystrokes, body movements, etc. The behavioral biometric data may be analyzed to determine whether there has been a user change or otherwise verify that there has not been a break in user continuity at any time following verification of a user's identify following initial validation with, e.g., the physical biometric data, or ID and password. For example, a user's identity may be verified with a fingerprint reader and access may be provided thereafter to the services provided by the gaming system 100, e.g., for a predetermined period of time or until some predetermined event, such as the gaming device 113 being turned off, the device 113 being moved outside an approved gaming area, etc. The gaming system 100 may thereafter monitor behavioral biometric data with the device and prompt the user for physical biometric data or other identity verification data if it is determined from the behavioral data collected following identity verification that there may have been a change in the users of the device. For example, the user's heart rate or body temperature may be monitored following initial verification to determine if there are any changes in the data stream, e.g., in consecutive data readings, that may be attributed to a change in users, such as a sudden change in heart rate or temperature (either lower or higher) in a relatively short amount of time, e.g., in 5 seconds or less, or a break in the data, e.g., a null reading for one or more consecutive data readings, or a combination thereof.

The behavioral biometric data collected may be analyzed for any recognizable pattern that may indicate a user change. The data collected may be analyzed without reference to data collected previously, e.g. prior to the initial or an immediately preceding identity verification, or based on historic biometric data, e.g., data collected prior to the initial or the immediately preceding identity verification, for particular individuals or for a group of individuals. For example, a heart rate reading either above or below an average heart rate computed based on historic data for an authorized user may trigger the system 100 to prompt the user for identity verification data, such as for a user ID and password, or physical biometric data. A heart rate reading following a null reading in the data stream that is either below or above a heart rate reading before the break in the data stream may also trigger the prompt for identity verification data. Similarly, different peak heart rates in general or keyed to specific gaming events, such as at the time the user places a bet, wins or loses a wager, etc., may also trigger the prompt for identity verification data in order for the user to continue using the services of the system 100. The biometric data for establishing the data stream may be obtained repeatedly, such as continuously, cyclically, periodically, e.g., every second, minute, etc.

Pattern recognition may be applied to user continuity data other than behavioral biometric data, including data indicative of a user's proficiency with the system and/or the services provided by the system. For example the system may track the keystroke rate of a user in general or for particular services, e.g., games, and determine if the keystroke rate of a user following identity verification differs from the keystroke data obtained within the betting session following verification or from data obtained prior to the verification. Other proficiency data may be tracked to determine if there may have been a change in the user of the system 100, such as the rate at which the user navigates through the menus, false selections of menus or menu items, etc. Keystroke data may be mapped or certain events, such as wins or losses, as a measure for reducing false positives as a result of different keystroke rates that may be attributed to user nervousness. In any event, a prompt for identity verification data may also be triggered based on a determination that there may have been a change in the user based on the proficiency data collected.

The gaming system 100 may also verify user continuity by tracking the playing pattern of a user and prompting the user for identity verification data based on gaming commands or requests that deviate or are inconsistent from the playing pattern associated with the user. For example, if the user has a pattern of never having wagered more than $100 on any particular game, the system 100 may prompt the user for verification data, such as physical biometric data, if the user makes a wager of $500 or any appreciable amount above the highest wager, such as 5% or greater than the highest wager. Similarly, the system 100 may track the user's response to wins or losses and prompt the user for identity verification data on any deviation therefrom. For example, a user may establish a pattern of placing a higher wager on every win and lowering the wager on a loss. The system 100 may, upon comparing playing pattern data obtained previously and current playing pattern data and determining therefrom that a wager deviates from the pattern of wagers for the particular authorized user, prompt the user for identity verification data before the user is allowed to continue accessing the services provided by the system 100. Continuity may also be tracked with an authentication device as discussed below.

The system 100 may track the user continuity data, e.g., behavioral biometric, proficiency, playing pattern, as well as any other variable type data obtained from users for a sufficient amount of time to collect a data set for the comparisons discussed above. The amount of data in the data set for the comparison will generally vary based on the type of data and the desired sample set for the comparison. For example, in determining whether there may have been a user change based on a change in consecutive data readings, such as when there is a break in the data stream, the amount of data necessary for the comparison generally includes two consecutive readings: a first reading followed by a second reading having an appreciable value, e.g., 5% or greater, above or below the first reading. Similarly, when the comparison is based on historic data, the amount of data necessary for the comparison includes at least two non-consecutive readings: a first reading at a time to classify the data as historic data, e.g., prior to the then current physical biometric identity verification, and a second more recent reading, e.g., after the then current physical biometric identity verification, having an appreciable value above or below the first reading. It can be appreciated that a larger data set, in certain instances, may yield greater accuracy or less false prompts for additional data (false positives). For example, comparison of a current reading with, e.g., the average of 5 prior readings, may result in less false positives in that the average value will tend to diminish the impact of noise in the data set for the comparison. Alternatively or additionally, the system 100 may filter noise from the data set for the comparison. The system 100 may, for example, filter improbable data, such as temperature readings less 90 degrees F. and greater than 110 degrees F., heart rates less than 40 bpm and greater than 180 bpm, etc.

In one embodiment, the system 100 triggers the prompt for identity verification data based at least on a configurable level of confidence associated with the comparison. The level of confidence may be set, e.g., by a system administrator or by the user. The level of confidence may be set in any manner including by adjusting variables that factor into the confidence or the probability of a false positive or negative, as the case may be, such as the difference between the data that will trigger the prompt for identity verification data, the amount of data in the data set used for the comparison, the filters used to filter noise from the data set for the comparison, etc.

In one embodiment, the system 100 tracks data indicative of a false positive, which may be used as a basis for adjusting variables associated with the data set, the data set filters, the difference between the data that triggers the prompt, etc., and/or algorithms used to trigger the prompt for identity verification data. False positive data generally includes a positive verification of the user's identity in response to a prompt for identity verification data following a trigger. The data indicative of the false positive may further include the amount of time between the prompt and the positive verification, or any other data which may indicate that the positive verification of the user's identity is attributed to a user change back to the authorized user, including the data believed to be suspect.

The data resulting in a false positive, prompting the user for identity verification data, may further be input into a neural network which adjusts the variables associated with the data set, the data set filter, algorithms, etc. accordingly. Similarly, data indicative of true positives may also be input into the neural network. The neural network may be trained using supervised, unsupervised learning, and reinforced learning techniques, or a combination thereof. With supervised techniques, the neural network is supplied sets of example pairs, e.g., data reading(s) and an indication of the data reading(s) is/are false or true positive, and the neural network infers a mapping implied by the data. With unsupervised techniques, the neural network is supplied with data and the neural network derives therefrom a mapping without the aid of the false or true positive indications, such as based on statistical modeling, filtering, blind source separation, clustering, etc. With reinforcement learning, the data is derived generally from interactions within the system and observations made therefrom. In addition to the data resulting in a false positive, any of the data discussed herein may be supplied to the neural network to adjust the size of the data set, vary the data set filter values, the difference between the readings that trigger the prompt, etc., as the case may be, to achieve a desired confidence, such as greater than 85% or greater accuracy. Alternatively or additionally, the data resulting in a false positive maybe fed into a support vector machine, which classifies the data using a supervised machine learning technique. Image type data may further be preprocessed prior to being introduced into the neural network or the support vector machine to create an abstract representation of the image that is dimensionally smaller than the image data. Preprocessing may be performed using statistical techniques, such linear discriminant analysis techniques.

The system 100 may detect various types of errors and may further categorize the types of errors in one of a plurality of categories, such as a type I error, a type II error, etc. The categories may be derived based on the severity of the error or any other characterization scheme. For example, a false identity verification with physical biometric data may be classified as a type I error which has greater weight than a false identity verification with behavioral biometric data classified as a type II error. The manner in which the system 100 responds to errors may be class dependent. In this respect, the system 100 may favor certain classes of errors and respond, e.g., aggressively or favorably, based on the class of the error. For example, the system may block all access with type I errors while providing continued access for type II errors until a configurable tolerance has been crossed. For instance, continued access may be provided until a certain number of type II errors have been registered, e.g., 3 or more type II errors. In this respect, type II errors favor permitting rather than excluding game play in comparison to type I errors. The classification and the threshold maybe be either administrator or user configurable. Additionally, users may be limited to only configuring the classification of certain errors and thresholds more restrictively. For example, users may be limited to only adding default type II errors into type I error class with a more aggressive response that type II errors. Similarly, the user configuration with regard to the threshold may be limited to only reducing the threshold, e.g., to 2 instead of 3 type II errors, before accesses is blocked. All user configurations may be stored in a user profile in one or more databases associated with the gaming system 100. The thresholds and/or classifications may be location specific. For example, the thresholds for certain types of errors while in a hotel restaurant may be relaxed to account for the user engaging in other activity, such as eating.

The gaming system 100 may provide users with access to various types of services including one or more of a plurality of different types of games, e.g., card games; slot-machine style games; craps; other casino-style games; table games, such as poker, craps, roulette, blackjack, baccarat, etc.; the wheel of fortune game; keno; sports betting; horse, dog, or auto racing; jai alai; lottery-type games, including video versions of scratch off lotteries. The system 100 may provide game play based on the outcome of any type of event, such as sporting events and athletic competitions, including football, basketball, baseball, golf, etc., and non-sporting events, such as on the movement in particular financial markets, indexes, or securities, political elections, entertainment industry awards, box office performance of movies, weather events, etc. The games may be provided both with and without wagering, or with simulated wagering using points that may be traded in for prizes. The gaming system 100 may also provide non-gaming services, e.g., on the gaming device 113, such as audio and video entertainment, news, messaging, telephone, IP telephony, etc.

The gaming system 100 may be implemented over any type of communications network 116, such as a local area network (LAN), a wide area network (WAN), the Internet, a telephone network (POTS), a wireless network, including cellular, WiFi, and WiMax networks, or a combination of wired and/or wireless networks. The communications network 116 may be entirely independent of the Internet. The system 100 may alternatively limit the information transmitted over the Internet to that with little or no security risk, or that which has been encrypted.

As noted above, the gaming system 100 may, in certain embodiments, allow users to access services provided by the system from one or more of a plurality of remote locations. The system 100 may also allow users to access the services of the system 100 with the device 113 while mobile or transient. For example, the gaming system 100 may allow users to access services in any location within a service area 148, such as within the vicinity of a hotel. Service area 148 may further be broken down into a plurality of sub-areas 140, 146, such as the casino of a hotel vs. general occupancy areas, e.g., the lobby, the pool, the gym, etc. The service area 148, in the broadest sense, includes any location within the communication capability of the system 100. Thus, service area 148 for services provided over the Internet includes any location with access to the Internet. Similarly, service area 148 for services provided by wireless communication includes any locations within the transmission range of the transmitter and/or reception range of the receiver. The service area 148 may be limited artificially by the system provider and/or the user within certain geographic boundaries. For example, the system provider may limit the service area to within one or more states, cities, municipalities, hotels in a city or municipality, areas within the hotel, such as the casino area, etc., or a combination thereof. Thus, the system 100 may provide services to users in a disjointed area 140, as shown in FIG. 1, where the service provider provides services in one state, such as Nevada, and one or more cities in another state, such as in Atlantic City, N.J., or in any one or more hotels within a city. User defined location access limits may be stored in a user profile in a database associated with the system 100.

Accordingly, in one embodiment, the system 100 has a location verification feature, which is discussed below in greater detail. The location verification feature may be used to permit or block users from accessing the services provided by the system 100 based on the particular location of, e.g., the gaming device 113. For example, services may be enabled when it is determined that the location of the gaming device 113 is within a pre-defined area 140, such as within the area of a hotel that provides the services disclosed herein, or disabled when the device 113 is moved to a location outside of the area 140. The location verification feature may also be used to disable fewer than all of the services of the gaming system 100 based on the location of the device 113. For example, the system 100 may limit wager-type gaming to areas where such gaming is permitted by law, such as to the casino area of a hotel, whereas non-wagering services, such as messaging, may be enabled irrespective of the location of the device 113. Particular services may also be enabled or disabled by the provider and/or the user based on the location of the device. For example, the user may be allowed to disable non-wagering services, such as messaging, when the user is within the wagering area, such as the casino, and/or during certain events, such as when the user is engaged in game play. As with the classification and threshold limitations discussed above, the user may only be allowed to specify more restrictive service limitations and thus may not be able to override certain limitations imposed by the service provider. For example, the user may not be allowed to enable wager-type gaming in areas where that type of gaming is has been disabled by the service provider. The user defined service limitations may be stored in a user profile in a database associated with the system 100.

In one embodiment, the gaming system 100 provides services in at least two areas 140, 146 each of the areas having a different level of surveillance than the other. The level of surveillance may be quantified based on any scheme indicative of the effectiveness with regard to determining whether an authorized user is in fact using the gaming system 100 or that the gaming system 100 is being used properly. The level may be established based on the number of measures implemented in this regard. For example, the level of surveillance for an area using face recognition and human surveillance may be deemed greater than an area with only fingerprint scanning. Alternatively or additionally, certain measures may be given greater weight, e.g., based on the reliability of the measure. For example, a fingerprint scan may have a greater reliability or accuracy in verifying the identity of a user than an iris scan. The weight of a particular measure may be independent of its reliability and may simply be based on a subjective confidence in the measure, e.g. of the user or the service provider, relative to other measures. The surveillance level may have nominal designations indicative of overall effectiveness and/or confidence. For example, the level of an area may be classified as being A, B, C, . . . , Z; low, medium, high, or as a Type I, II, III, . . . . The surveillance level may also be distinguished using finer nominal designations, such as 0% to 100% in increments of 1, 0.1, 0.01, . . . .

In one embodiment, the system 100 provides access based on the surveillance level of the area the gaming system 100 is being accessed from, e.g., the location of the gaming device 113. That is, surveillance based access may allow access to one or more services if there is a sufficient level of surveillance, defined by either the system provider and/or the user. In this respect, surveillance based access may be implemented in any one of a number of ways. The system may, for instance, provide wager-type gaming services only if the level of security associated with the access area satisfies a minimum level. For example, a user may limit wager-type gaming with system 100 to areas having no less that a type I surveillance level, such as a casino. Thus, wager-type gaming will be disabled in type II surveillance level or less areas, such as hotel common areas, e.g., the pool, the hotel lobby, and non-common areas, such as hotel rooms.

In one embodiment, the system 100 supplements the surveillance of the area with surveillance measures available with the system 100 to achieve the desired surveillance level. Further to the previous example, the system 100 may increase the surveillance level of type II areas to type I for wager-type gaming by prompting the user for identity verification data and/or collect user continuity data thereby adding to the surveillance level of type II areas sufficient to classify the area with the combined area and device surveillance measures as a type I or better. Thus, the system 100 may allow the user to access services in higher surveillance areas, such as casinos, without biometric data while requiring biometric data with the device in areas with lesser surveillance, such as the hotel courtyard. Surveillance based access limitations may be stored in a user profile in a database associated with the system 100.

As can be appreciated from the present disclosure, the system 100 may maintain a plurality of different types of data, such as physical biometric data, behavioral biometric data, proficiency data, playing pattern data, etc., for identity verification purposes for each authorized user. The system 100 preferably verifies the identity of a user before allowing the user to access at least one of the services provided therewith. In this respect, the system may require that the user submit at least one item of identity verification data, such as an ID and password combination, or any one of the physical biometric data items discussed herein, etc. The system may further require from the user at least one additional item of identity verification data for system access. In this respect, the system maintains at least one item of redundant verification data. The requirement for additional verification data may be implemented in certain but not all instances. For example, additional verification data may be required in certain areas of a hotel, such as those with lesser surveillance or reliability as discussed above. In these areas, the system 100 may prompt the user for a first and a second item of verification data, such as at least two of: a facial image, an iris scan, a retinal scan, a fingerprint scan, a vascular pattern scan, etc., before allowing the user to access the system services. The surveillance level or reliability associated with each of the measures may be added to achieve a desired surveillance level or reliability as indicated above.

The user may generally customize any of the aspects of the services provided by the system 100 or any other customizable aspect of the system 100, including classification and threshold configurations, and service, location, and surveillance based access limits. In certain instances, customization generally allows users to vary the level of security, e.g., above a minimum set by a service provider, to a level based on the user's comfort level and/or the location where services are being accessed. For example, if the user only intends to access the system 100, e.g., the gaming device 113, at a particular casino, the user may configure the system 100 to require biometric data at any time the gaming device is used at a off the premises of the particular casino, e.g., at another casino. This feature may be used to prevent a situation where a thief steals the gaming device 113 and attempts to access services at another casino. The services may be customized for each device 113 individually or for groups of devices.

The system 100 may further be configured to encrypt data, such as the physical biometric data, before it is communicated from the gaming device 113 to the remote computer 118 over network 116 for authentication. In one embodiment, this is accomplished with a one-way encryption algorithm that encrypts, e.g., the identity verification data, to produce a string of alphanumeric characters having a length, such as 100 or greater, from, in certain instances, image data. The string may then be communicated to the remote computer 118 for verification, which is compared with data in the user's profile. The remote computer 118 preferably does not store any identity verification data in the raw form, i.e., unencrypted. Rather, the remote computer stores the post encryption string of characters for the validation. Thus, a match between the string of characters communicated from the device for identity verification and the stored string, within a configurable tolerance, will result in enabling the user to access one or more of the services provided by the system 100. The gaming device 113 may also be configured so that the raw and/or the encrypted identity verification data is not stored permanently and/or to purged periodically, following validation, when the data is transmitted successfully to the remote computer 113, or at any other time the data is no longer needed for the immediate validation. Therefore, in this instance, the gaming device 113 will be required to obtain and/or encrypt identity verification data anew each time there is a prompt for such data.

The system 100 may also disable access thereto with a hard check mechanism. That is, device 113 may include a reader 150 that obtains information from a corresponding authentication device 155. The authentication device 155 may be any item for storing information thereon, such as a card which bears a magnetic strip, such as a credit card, a key that includes an RFID transponder, a limited-distance signal emitter or other transponder, a smart card, a bracelet or wristband which includes a signal transmitter, such as an RFID signal transmitter, or which includes a magnetically encoded signal, a substrate that bears a bar code or other optically readable identifier, or any combination thereof. The reader 150 may be a magnetic strip reader, an RF or infrared receiver, an optical scanner, etc.

The gaming device 113 may therefore be capable of detecting a signal from the authentication device 155 and the system 100 may enable system access based on the signal from the authentication device 155. Continued access may also be conditioned on the gaming device 113 receiving continuing to detect the signal from the authentication device 155. The signal produced by authentication device 155 may additionally or alternatively include information stored on the device 155, such as identity verification data, or any other data that may be used as a key for system access. In one embodiment, the authentication device 155 includes a token that is derived from the authorized user's biometric data, such as the string of alphanumeric characters derived from the user's biometrics. The system 100 may then provide access based on a comparison of the string of characters derived from the biometric sensor reading and the string stored on the authentication device. Alternatively or additionally, the data stored on the authentication device 155 may be used to authenticate the user without other identity verification data. That is, the authentication device data may be given greater weight and may thus be used as the primary data for identity verification.

It is understood that all or some of the data discussed herein may be stored on the authentication device 155 and used as a basis for the comparison with data obtained for identity verification. For example, the device 155 may include physical biometric data, such as fingerprint data, that is compared with fingerprint data received for immediate identity verification. The data used for the comparison may also be limited to being stored to areas only within the user's control, such as areas other than the authentication device 155 and/or the gaming device 113. Validation may therefore be accomplished locally between the gaming device 113 and the authentication device 155; without the transfer of identity verification data to the remote computer 118 for this purpose. Alternatively or additionally, the validation may be accomplished between the remote computer 118 and the authentication device 155.

The functionality disclosed herein may be provided with software that resides on both the gaming communication device 113 and the remote computer 118. Software resident on gaming communication device 113 is preferably operable to present information corresponding to the system services, including wagering and non-wagering type gaming to the user. The information includes, without limitation, graphical and/or textual representations of objects associated with the services, e.g., in one or more interface screens, windows, and/or message boxes, with the presentation of selectable options related to the services, such as menus, icons, buttons, selectable areas, hyperlinks, etc. The gaming device software is also preferably operable to receive data from the remote computer 118 and data input by the user. Software resident on the remote computer 118 is preferably able to exchange data with the gaming device 118, access additional computers, and data storage devices, and perform all of the functions described herein, including providing the backend functionality for the services discussed herein as well those common to gaming systems.

The data discussed herein as being transmitted or used by the various devices of the gaming system 100 may be in any format, which is necessary or desirable for the services provided for the user. The information may be transmitted in whole or in fractional portions thereof, in any format including digital or analog, text or voice, and according to any transport technology, which may include wired or wireless technologies. Wireless technologies may include licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, physical communication lines, trunks, antennas, switches, cables, transmitters, receivers, computers, routers, servers, fiber optical transmission equipment, repeaters, amplifiers, etc.

In at least one embodiment, some or all of the data communication may take place through the Internet or without involvement of the Internet. In certain embodiments, a portion of the information may be transmitted over the Internet while another portion of the information is communicated over a more secure network. For instance, graphic files depicting a roulette table, such as files in .gif or .jpg formats, may be communicated over the Internet while gaming information, such as the results from roulette wheel spin, may be communicated in a parallel network and assembled at the gaming device 113 for display together in a single interface screen. In addition to security considerations, the choice of which of the plurality of networks handle the split data may be based on the bandwidth of the network. Thus, larger graphics files may be transmitted to device 113 over a WiMax network while smaller data files are transmitted over a cellular network.

Figure 2:
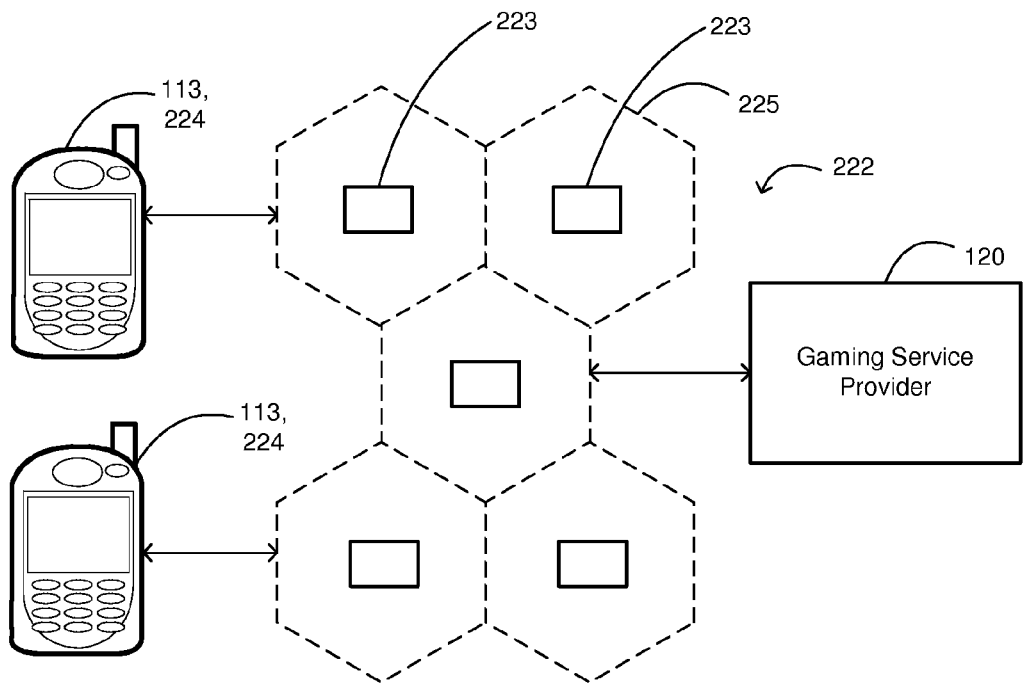
FIG. 2 illustrates a gaming system according to at least one embodiment of the systems disclosed herein.

Referring to FIG. 2, the communication network 116 may be a cellular network 222. Cellular network 222 comprises a plurality of base stations 223, each of which has a corresponding coverage area 225. Base stations may have coverage areas that overlap. Further, the coverage areas may be sectorized or non-sectorized. In the cellular network, the gaming device 113 is generally a mobile station 224, such as a cell phone, that may be transient within the network. The mobile stations 224 communicate with the base stations 223 wirelessly via radio signals. The base stations 223 generally communicate with, e.g., the remote computer 118, over landlines, such as POTS, T1-T3, ISDN, etc. Each base station is preferably programmed to send and receive voice and/or data transmissions to and from mobile station. The gaming device 113 may be coupled to the remote computer 118 with a private label cellular carrier. The mobile stations 224 are preferably preprogrammed with the carrier's authentication software to establish a connection to the cellular network.

Figure 3:
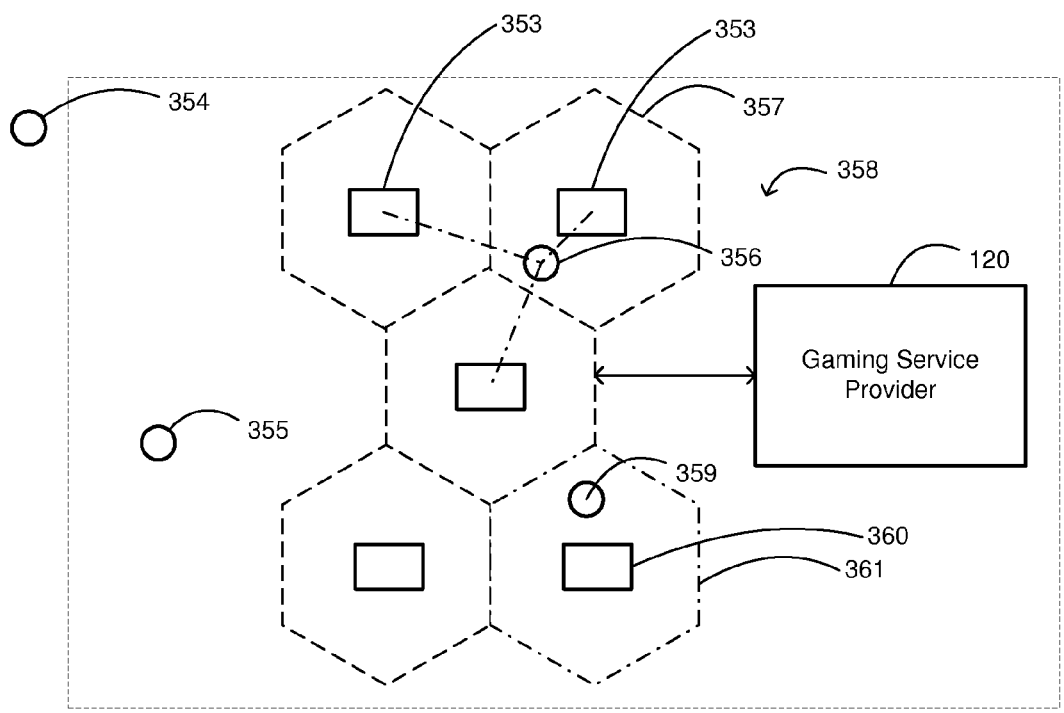
FIG. 3 illustrates a gaming system according to at least one embodiment of the systems disclosed herein.

In one embodiment, the location verification feature for determining the location of the gaming device 113 does so in relation to the location of at least one of the base stations of the cellular network. That is, the system 100 determines the location of the gaming device 113 based on the location of one or more base stations and the distance and/or the direction (azimuth) of the device 113 from at least one base station. The distance may be determined based on the strength of the transmit signal received from gaming device 113. That is, the gaming system device's transmitter communicates at a fixed transmit power output. The attenuation of the transmit signal is generally a function of the distance between the transmitter and the receiver. Thus, the power of the signal received from the device 113 may be measured at the base station and the distance determined there from, e.g., calculated, or looked up in a database or table that maps distance to signal strength. The direction may be determined based on the azimuth of the antenna receiving the signal from the device 113. Alternatively or additionally, the direction may be determined based on the distance of the device 113 from a plurality of the base stations 223, such as two or three, using techniques, such as triangulation, multilateration, etc., as shown in FIG. 3. Determining the location of the gaming device 113 based on the power level of the signal received form the gaming device is not limited to cellular network. Rather, the process is generally applicable to all types of wireless networks, including satellite, WiFi, GPS, LORAN, RFID, etc., where the location of the base stations are known and the location of the device 113 may be derived based on the distance from the base station.

Referring to FIG. 3, in one embodiment, the location verification feature is implemented using geo-fencing. That is, the location based access features disclosed herein are enforced based on the communication range of base stations in the wireless communication network. For example, the gaming system 100 may communicate with a plurality of gaming devices 354, 355, and 356. Device 354 is shown located outside the gaming jurisdiction or area 358. Devices 355 and 356 are both located inside gaming area 58. However, only device 356 is located within sub-area or geo-fence 357, which is defined by the perimeter of the coverage areas of the plurality of base stations 353. Thus, geo-fencing may be used to enable access for device 356 but disable services for devices 354 and 355. Even though some gaming devices may be within the area 358, such as device 355, those devices may not be allowed to access the gaming system 100 based on its location in relation to geo-fence 357. The base stations may be cellular base stations as discussed above or base stations having a relatively short range, such as WiFi or RFID transmitters/receivers, located within the premises of a hotel. The short-range base stations may, for example, be set up within the service area in a grid pattern, e.g., in the ceiling of a facility, with sufficient separation to determine the location of the device.

Location verification may be implemented with multiple overlapping as well as non-overlapping geo-fences. For example, geo-fence 361 may be defined by the range of fewer than all of the base stations in the network, such as base station 360, which includes all of the base stations in a casino. Geo-fence 360 may be a subset of the area of geo-fence 357 or excluded from area 357, which may include all of the base stations in a hotel. In either event, location based access features, such as classifications, thresholds, services, surveillance, etc., may be geo-fence specific. Geo-fencing may further be combined with triangulation and/or other location verification techniques to determine the specific location of the device within the geo-fence. For example, the location of device 356 may be determined based on triangulation between three of the base stations 353.

Alternatively or additionally, the device 113 may include a global positioning satellite (GPS) chip that determines the location of the device based on signals received from GPS satellites. The GPS chip may stand alone, in which instance the GPS chip sends the GPS location data to other components of the device, such as the processor 122 and/or communication element 124, or part of a single computer chip that combines the function of the GPS chip with the other element.

The location verification feature may generally be implemented with an element, i.e., a location verification element, which is a component of the gaming device 113, the remote computer 118, any intermediary component there between, such as the base station or stations, or a combination thereof. The location verification element may be implemented in hardware, software, or a combination thereof, and generally determines the location of the gaming device 113.

In connection with any of the location determination methods, the gaming system 100 may periodically update the location determination information. This may be done, for example, during a gaming session, at pre-defined time intervals to ensure that movement of the gaming device 113 to an unauthorized area is detected during play, and not just upon login or initial access.

Figure 4:
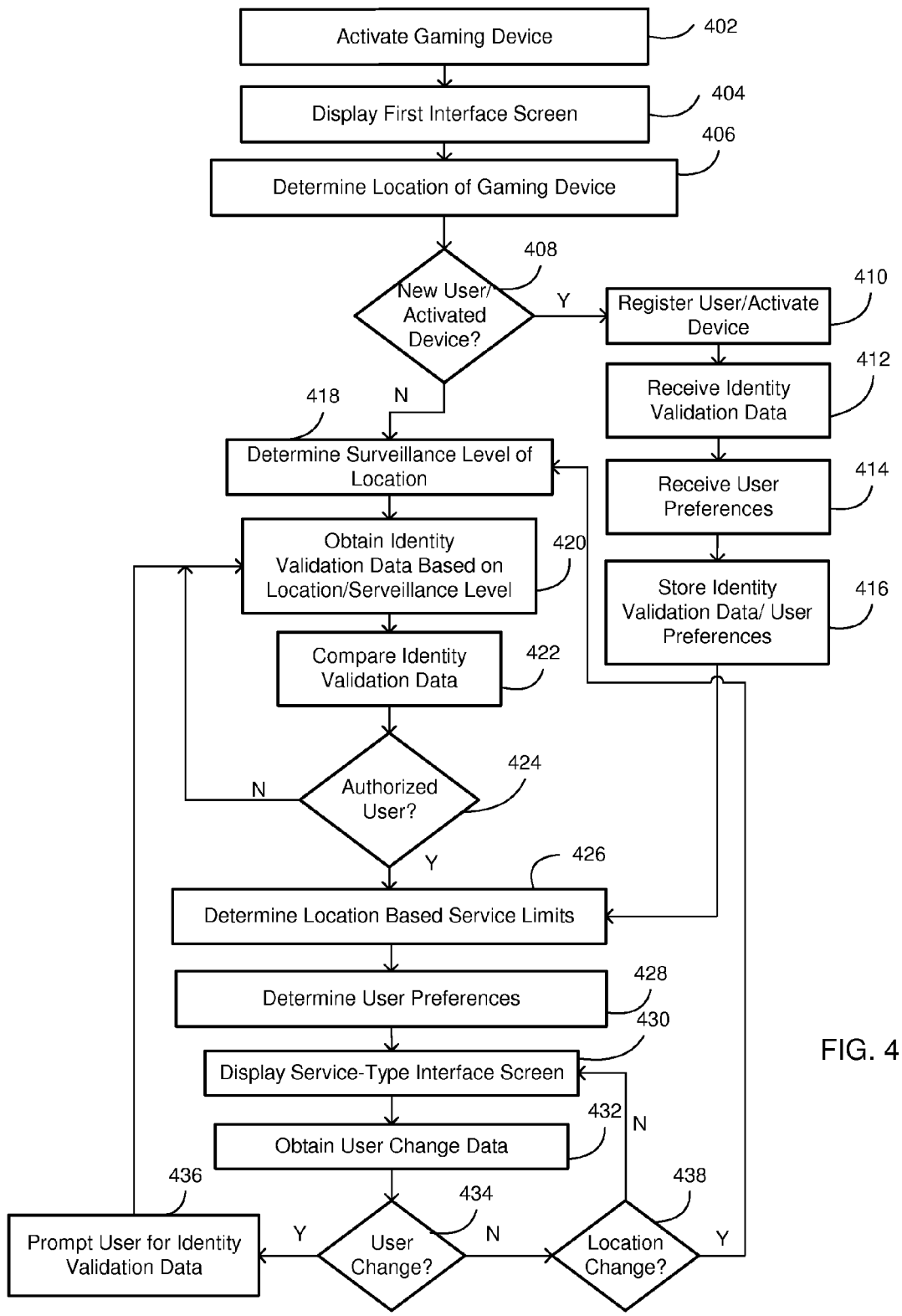
FIG. 4 is a flow chart of a method according to at least one embodiment of the methods disclosed herein.

Referring to FIG. 4, a method according to at least one embodiment of the methods disclosed herein begins at 402 with initiating the gaming device 113. Initiation is dependent on the type of the gaming device 113. For example, initiation may simply be turning the device 113 or running an application, such as a browser application or special purpose software. In one embodiment, initiation includes communicating an initiation message from the device 113 to the system 100, e.g., the remote computer 118. The initiation message is generally interpreted by the system 100 as a first request for access. The initiation message may include information therein identifying the device and/or the user, such as a unique device identification number, e.g., for an initial access determination. The unique device identification number may be serial number, a cell-phone number, an IP address, etc.

In one embodiment, the system 100 displays at 404 a first interface screen in response to initiation, such as in response to the initiation message. The first interface screen may be stored locally on the device 113 or communicate over the network 116 to the device 113 for display. The nature of the first interface screen will vary depending on the circumstances. For instance, if the device 113 cannot establish link to the remote computer 113, the first interface screen may contain a message indicating as such. Alternatively, upon successfully establishing the necessary connection, the first interface screen may include at least one form element therein, such as a text box, for the user to enter an ID, a password, or a combination thereof to log into the system 100. The ID and/or password may generally be used as a first level of identity verification and for providing users with user specific customized services. Alternatively or additionally, the customized services may be device specific in which instance the device identification number may be used distinguish the particular device 113 from all other devices in the system.

If at 408 it is determined that the user is new and/or the device has not been activated, the user and the device may at 140 be registered and activated for service, respectively. In one embodiment, the user is registered by receiving at 412 identity verification data, such as a user ID and password, name(s), identification number, address, credit card number (s), physical biometric data, e.g., a fingerprint scan, an iris scan, a retinal scan, a vascular pattern scan, a facial image, etc. The identity verification data may be authenticated with a third party provider, such as the relevant department of motor vehicles, a credit rating agency, etc. User preference information may also be received at 414, such as preference information relating to error classifications and thresholds, location access limits, service limits, surveillance limits, etc. The identity verification data may be encrypted and stored at 416 either with the remote computer 118 or the authentication device 155, as discussed above, and the device 113 may at 417 be activated for service. Once all the requisite and/or desired information is obtained, an appropriate service-type interface screen is displayed at 430.

If at 408 it is determined that the user and/or the device 113 are not new and activated, respectively, the system 100, in one embodiment, determines at 406 the location of the device 113. The location of the device 113 may be determined in a variety of ways, as discussed above. In one embodiment, the location of the device 113 is determined based on the location of at least one base station with which the device 113 is in communication with wirelessly. The base station may be a base station in a cellular network, a local WiFi router, an RFID transponder, etc. The location of the device 113 may simply be an acknowledgement that the device 113 is communicating with at least one base station having a known location. Thus, it can be determined therefrom that the device is within an area defined by the communication range of the at least one base station. Additionally or alternatively, the location of the device 113 may be determined based further on the distance and direction of the device 113 from one or more base stations, e.g., based on the received signal power from the device transmitter. The determination of the device location may also be accomplished with GPS technology. In either instance, the location of the device 113 may be communicated and/or received by the system 10 for use in providing services as discussed herein. The location may be specified in terms of the coordinates, e.g., latitude and longitude, the base station communicating with the device, the class of base station the device is communicating with, e.g., base stations in the casino vs. those in the hotel, base stations in a wagering vs. non-wagering geo-fence areas, etc.

In one embodiment, the system 100 determines at 418 the surveillance level associated with the location of the device 113. This may be accomplished, for instance by looking up the surveillance level in a table that includes surveillance level data mapped to the locations within the service area of the system 100. Alternatively or additionally, the surveillance level may be computed in real-time based on surveillance measures in place at that time.

In one embodiment, the system 100 prompts the user for identity verification data, e.g. physical biometric data, based on the location and/or the surveillance level associated with the location of the device 113. In this instance, the system 100 implements a verification scheme based thereon. That is, the particular type and quantity of identity verification data required to access the services of the system 100 is based on the location and/or surveillance level associated with the location. For example, in a casino area the system 100 may not require any physical biometric verification for access whereas non-casino areas may require physical biometric verification with at least one item of physical biometric data. Similarly, certain common areas outside of the casino, identity verification may require further a second, redundant item of physical biometric data. In the context of the surveillance levels, areas with a type I surveillance may not require physical biometric verification whereas areas with type II surveillance may require at least one item of physical biometric data and areas with type III surveillance may further require at least one redundant item of physical biometric data. As noted above, the system 100 may implement a verification scheme to achieve a target surveillance level. That is, the system 100 may determine the surveillance level of the device location and require identity verification to the extent necessary to meet or exceed the target level. For example, at least one item of redundant verification data may be required to raise type II areas to a target type I. Similarly, at least two items of redundant verification data may be required to raise type III areas to target type I.

Identity verification data may then be compared at 422 with the data stored previously, such as with the remote computer 118 and/or the authentication device 155. If identity verification fails at 424, the system 100 may prompt the user for reentry or additional data. If verification passes, the system 100 may at 426 determine if there are any location based service limits and at 428 determine any applicable user preferences related thereto. That is, the system 100 may determine which of the plurality of available services the user will be provided access to based on the location of the device and/or the surveillance level associated with the location. For example, the system 100 may provide access to all services, such as wagering, entertainment, news, messaging, telephone, IP telephony etc., in the casino, when the device 113 is located within the casino. Similarly, access to all services other than wagering may be provided in all areas. In this respect, the system 100 blocks access to wagering services in certain areas, such as areas outside of the casino.

Following identity verification, a service appropriate interface screen may be displayed for the user at the device 113. That is, the interface screen displayed for the user includes therein selectable options for accessing the enabled services. Non-enabled services will preferably be blacked out. For example, the interface screen may include menu items, icons, hyperlinks, selectable text and graphics, etc., for each of the enabled services that when selected causes a related interface screen to be displayed. As noted above, the system 100 may provide users with access to, e.g., video versions of table games, such as poker. In this instance, a related interface screen may include graphics for video poker, including playing card graphics, betting selections, etc. The interface screens preferably include selectable elements for navigating through the service environment, e.g., for access to other services, and/or selectable elements for submitting gaming and wagering commands, such as hit, stay, hold, draw, bet, bet up, bet down, double down, etc.

In one embodiment, the system 100 obtains data for determining whether or not there has been a user change following the prior identity verification. As discussed above, a user change may be determined based on various types of data, such as behavioral biometric data, e.g., blood pressure, heart or pulse rate, body temperature data, speech, handwriting, keystrokes, body movements, etc., proficiency data, such as keystroke rate, menu item or icon selection rate, player pattern data, e.g., the magnitude and rate of gaming commands, wagering commands, etc. If it is determined at 434 that there may have been a user change since the previous identity verification, the system 100 may prompt the user for identity verification data at 436 or respond based on error classification and thresholds, and repeat identity verification. The system 100 preferably determines if there is a change in the location of the device 113 at 438 and adjusts/enables the services accordingly.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A method, comprising:
receiving at least one item of identity verification data from a device;
enabling, by at least one processor, at least one service on the device based at least in part on a match between the at least one item of identity verification data received and at least one other item of identity verification data obtained previously, wherein the at least one service comprises a wager-type game;
while the at least one service is enabled, receiving data obtained by a sensor of the device, wherein the data comprises an indication of body movement by a user of the device, in which the received data comprising an indication of body movement is different from any wager or gameplay input received from the user in the wager-type game;
subsequent to receiving the data and while the at least one service is enabled, receiving data obtained by the sensor of the device, wherein the data comprises an indication of a null reading by the sensor, in which the null reading comprises information affirmatively obtained by the sensor; and
based at least in part on receiving (i) the data that comprises the indication of body movement by a user of the device and (ii) the data that comprises an indication of a null reading by the sensor, prompting, by the at least one processor, the user of the device to provide identity verification data.

2. The method of claim 1, further comprising:
subsequent to enabling the at least one service, obtaining at least one item of user change data regarding a user of the device, wherein the at least one item of user change data comprises at least one of: playing pattern data, keystrokes, speech, blood pressure, heart rate, body temperature, and handwriting;
determining that the at least one item of user change data does not match with at least one item of user change data obtained previously; and
based on determining that the at least one item of user change data does not match with the at least one item of user change data obtained previously, prompting the user of the device to provide identity verification data.

3. The method of claim 2, wherein the method further comprises: in response to determining that the at least one item of user change data does not match with the at least one item of user change data obtained previously, determining a severity of the mismatch between the at least one item of user change data and the at least one item of user change data obtained previously; and
wherein prompting the user for identity verification data comprises prompting the user based on the determined severity of the mismatch between the at least one item of user change data and the at least one item of user change data obtained previously.

4. The method of claim 2, wherein the identity verification data is categorized in at least a first class and the user change data is characterized in at least a second class, the first class being associated with one category of severity of error and the second class being associated with one other category of severity of the error.

5. The method of claim 4, wherein the error classification is based on a severity of the error in relation to other errors.

6. The method of claim 4, wherein prompting the user to provide identity verification data is triggered based on registering a plurality of the second class of errors exceeding a configured allowable number of the second class of errors.

7. The method of claim 6, wherein at least one of the error class and the threshold for the second class of errors is user defined.

8. The method of claim 2, wherein determining that the at least one item of user change data does not match with the at least one item of user change data obtained previously comprises comparing playing pattern data obtained from the user with second playing pattern data obtained previously.

9. The method of claim 1, further comprising:
subsequent to prompting the user for identity verification data, determining that a user change has occurred; and
blocking access to the at least one service on the device based on the determination.

10. The method of claim 1, further comprising:
displaying an interface screen, wherein the interface screen comprises graphic objects associated with the wager-type game and at least one selectable element for the user to submit at least one of a gaming command and a wagering command during play of the wager-type game.

11. The method of claim 4, wherein prompting the user for identity verification data is based at least on one of:
determining a severity of the mismatch between the at least one item of user change data and the at least one item of user change data obtained previously; and
registering a plurality of the second class of errors exceeding a configured allowable number of the second class of errors.

12. An apparatus, comprising:
at least one processor; and
a non-transitory tangible computer readable storage medium storing instructions that, when executed by the at least one processor, cause the at least one processor to:
receive at least one item of identity verification data from a device;
enable at least one service on the device based at least in part on a match between the at least one item of identity verification data received and at least one other item of identity verification data obtained previously, wherein the at least one service comprises a wager-type game;
while the at least one service is enabled, receive data obtained by a sensor of the device, wherein the data comprises an indication of body movement by a user of the device; subsequent to receiving the data and while the at least one service is enabled, receive data obtained by the sensor of the device, wherein the data comprises an indication of a null reading by the sensor, in which the null reading comprises information affirmatively obtained by the sensor; and
based at least in part on receiving (i) the data that comprises the indication of body movement by a user of the device and (ii) the data that comprises an indication of a null reading by the sensor, prompt the user of the device to provide identity verification data.

13. The apparatus of claim 12, wherein the computer readable storage medium comprises flash memory.

14. The apparatus of claim 12, wherein the instructions, when executed by the at least one processor, further cause the at least one processor to:
subsequent to enabling the at least one service, obtain at least one item of user change data regarding a user of the device, wherein the at least one item of user change data comprises at least one of: playing pattern data, keystrokes, speech, blood pressure, heart rate, body temperature, and handwriting;
determine that the at least one item of user change data does not match with at least one item of user change data obtained previously; and
based on determining that the at least one item of user change data does not match with the at least one item of user change data obtained previously, prompt the user of the device to provide identity verification data;
wherein the identity verification data is categorized in at least a first class and the user change data is characterized in at least a second class, the first class being associated with one category of severity of error and the second class being associated with one other category of severity of the error; and
wherein prompting the user for identity verification data is based at least on one of:
determining a severity of the mismatch between the at least one item of user change data and the at least one item of user change data obtained previously; and
registering a plurality of the second class of errors exceeding a configured allowable number of the second class of errors.

15. An article of manufacture, comprising:
a non-transitory tangible computer readable storage medium storing instructions that, when executed by at least one processor, cause the at least one processor to:
receive at least one item of identity verification data from a device;
enable at least one service on the device based at least in part on a match between the at least one item of identity verification data received and at least one other item of identity verification data obtained previously, wherein the at least one service comprises a wager-type game;
while the at least one service is enabled, receive data obtained by a sensor of the device, wherein the at data comprises an indication of body movement by a user of the device, in which the received data comprising an indication of body movement is separate from any wager or gameplay input received from the user in the wager-type game;
subsequent to receiving the data and while the at least one service is enabled, receive data obtained by the sensor of the device, wherein the data comprises an indication of a null reading by the sensor, in which the null reading comprises information affirmatively obtained by the sensor; and
based at least in part on receiving (i) the data that comprises the indication of body movement by a user of the device and (ii) the data that comprises an indication of a null reading by the sensor, prompt the user of the device to provide identity verification data.

16. The article of manufacture of claim 15, wherein the instructions, when executed by the at least one processor, further cause the at least one processor to:
subsequent to enabling the at least one service, obtain at least one item of user change data regarding a user of the device, wherein the at least one item of user change data comprises at least one of: playing pattern data, keystrokes, speech, blood pressure, heart rate, body temperature, and handwriting;

determine that the at least one item of user change data does not match with at least one item of user change data obtained previously; and based on determining that the at least one item of user change data does not match with the at least one item of user change data obtained previously, prompt the user of the device to provide identity verification data;

wherein the identity verification data is categorized in at least a first class and the user change data is characterized in at least a second class, the first class being associated with one category of severity of error and the second class being associated with one other category of severity of the error; and wherein prompting the user for identity verification data is based at least on one of:

determining a severity of the mismatch between the at least one item of user change data and the at least one item of user change data obtained previously; and registering a plurality of the second class of errors exceeding a configured allowable number of the second class of errors.

17. A method comprising:

receiving at least one item of identity verification data from a device;

enabling, by at least one processor, at least one service on the device based at least in part on a match between the at least one item of identity verification data received and at least one other item of identity verification data obtained previously, wherein the at least one service comprises a wager-type game;

while the at least one service is enabled, obtaining at least one item of user change data regarding a user of the device, wherein the at least one item of user change data comprises at least one of: blood pressure, heart rate, and body temperature, in which the user change data is different from any wager or gameplay input received from the user in the wager-type game;

determining that the at least one item of user change data does not match with the at least one item of user change data obtained previously; and based on determining that the at least one item of user change data does not match with the at least one item of user change data obtained previously, prompting, by the at least one processor, the user of the device to provide identity verification data.

18. The method of claim 17, wherein the level of confidence is set by the at least one processor prior to the comparison between the at least one item of user change data with at least one item of user change data obtained previously.

19. The method of claim 17, wherein prompting the user comprises prompting the user based on a level of confidence associated with the determination, the level of confidence providing an indication of whether the determination shows a change in user; and wherein the method further comprises establishing the level of confidence, wherein establishing the level of confidence comprises adjusting at least one of: a difference between the data that triggers the prompt for identify verification data;

an amount of data in a data set used for comparison of the at least one item of user change data with at least one item of user change data obtained previously; and one or more filters to filter noise from the date set for the comparison of the at least one item of user change data with at least one item of user change data obtained previously.

20. An apparatus, comprising:

at least one processor; and a non-transitory tangible computer readable storage medium storing instructions that, when executed by the at least one processor, cause the at least one processor to:

receive at least one item of identity verification data from a device;

enable least one service on the device based at least in part on a match between the at least one item of identity verification data received and at least one other item of identity verification data obtained previously, wherein the at least one service comprises a wager-type game;

while the at least one service is enabled, obtain at least one item of user change data regarding a user of the device, wherein the at least one item of user change data comprises at least one of: blood pressure, heart rate, and body temperature, in which the user change data is different from any wager or gameplay input received from the user in the wager-type game;

determine that the at least one item of user change data does not match with the at least one item of user change data obtained previously; and based on determining that the at least one item of user change data does not match with the at least one item of user change data obtained previously, prompt the user of the device to provide identity verification data.

21. The apparatus of claim 20, wherein prompting the user comprises prompting the user based on a level of confidence associated with the determination, the level of confidence providing an indication of whether the determination shows a change in user; and wherein the instructions, when executed by the at least one processor, further cause the at least one processor to establish the level of confidence, wherein establishing the level of confidence comprises adjusting at least one of: a difference between the data that triggers the prompt for identify verification data;

an amount of data in a data set used for the comparison of the at least one item of user change data with at least one item of user change data obtained previously; and one or more filters to filter noise from the date set for the comparison of the at least one item of user change data with at least one item of user change data obtained previously.

22. An article of manufacture, comprising:

a non-transitory tangible computer readable storage medium storing instructions that, when executed by at least one processor, cause the at least one processor to:

receive at least one item of identity verification data from a device;

enable least one service on the device based at least in part on a match between the at least one item of identity verification data received and at least one other item of identity verification data obtained previously, wherein the at least one service comprises a wager-type game;

while the at least one service is enabled, obtain at least one item of user change data regarding a user of the device, wherein the at least one item of user change data comprises at least one of: blood pressure, heart rate, and body temperature, in which the user change data is different from any wager or gameplay input received from the user in the wager-type game;

determine that the at least one item of user change data does not match with the at least one item of user change data obtained previously; and based on determining that the at least one item of user change data does not match with the at least one item of user change data obtained previously, prompt the user of the device to provide identity verification data.

23. The article of manufacture of claim 22, wherein prompting the user comprises prompting the user based on a level of confidence associated with the determination, the level of confidence providing an indication of whether the determination shows a change in user; and
- wherein the instructions, when executed by the at least one processor, further cause the at least one processor to establish the level of confidence, wherein establishing the level of confidence comprises adjusting at least one of: a difference between the data that triggers the prompt for identify verification data;
- an amount of data in a data set used for the comparison of the at least one item of user change data with at least one item of user change data obtained previously; and
- one or more filters to filter noise from the date set for the comparison of the at least one item of user change data with at least one item of user change data obtained previously.

\* \* \* \* \*